United States Patent
Hara et al.

(10) Patent No.: US 9,725,132 B2
(45) Date of Patent: Aug. 8, 2017

(54) BICYCLE CRANK ASSEMBLY

(71) Applicant: Shimano Inc., Sakai, Osaka (JP)

(72) Inventors: Nobukatsu Hara, Osaka (JP); Michihiro Kodama, Osaka (JP)

(73) Assignee: Shimano Inc., Osaka (JP)

( * ) Notice: Subject to any disclaimer, the term of this patent is extended or adjusted under 35 U.S.C. 154(b) by 417 days.

(21) Appl. No.: 14/337,779

(22) Filed: Jul. 22, 2014

(65) Prior Publication Data

US 2015/0274253 A1    Oct. 1, 2015

Related U.S. Application Data

(60) Provisional application No. 61/970,869, filed on Mar. 26, 2014.

(51) Int. Cl.
| | | |
|---|---|---|
| *B62M 1/36* | (2013.01) | |
| *B62M 3/16* | (2006.01) | |
| *B62M 1/10* | (2010.01) | |
| *B62M 3/00* | (2006.01) | |

(52) U.S. Cl.
CPC ............. *B62M 1/36* (2013.01); *B62M 1/105* (2013.01); *B62M 3/00* (2013.01); *B62M 3/003* (2013.01); *B62M 3/16* (2013.01); *Y10T 74/2165* (2015.01)

(58) Field of Classification Search
CPC .......... B62M 1/105; B62M 1/36; B62M 3/00; B62M 3/003; B62M 3/04; B62M 3/16; B62M 9/10; B62M 9/105; B62M 9/16; B62M 9/08; Y10T 74/2165; Y10T 74/2164

See application file for complete search history.

(56) References Cited

U.S. PATENT DOCUMENTS

| | | | | |
|---|---|---|---|---|
| 3,850,044 A | * | 11/1974 | Hagen | ...................... B62M 9/08 474/56 |
| 3,940,187 A | * | 2/1976 | Suda | ................... F16C 29/0688 384/43 |
| 3,994,180 A | * | 11/1976 | Ackerman | .............. F16H 55/54 474/137 |
| 4,181,043 A | * | 1/1980 | Waddington | ............. B62M 9/08 475/16 |

(Continued)

FOREIGN PATENT DOCUMENTS

| | | |
|---|---|---|
| DE | 38 38 359 C2 | 5/1990 |
| FR | 2610060 A1 | 7/1988 |
| FR | 2881199 A1 | 7/2006 |

*Primary Examiner* — James Ference

(74) *Attorney, Agent, or Firm* — Global IP Counselors, LLP

(57) ABSTRACT

A bicycle crank assembly having a rotational center axis is basically provided with a crank member and a sprocket member. The crank member includes a support portion that extends in the axial direction and an arm portion that is integrally rotatable around the rotational center axis with the support portion. The sprocket member includes a sliding portion that extends in the axial direction that is integrally rotatable with respect to the support portion and that is displaceable in the axial direction. The bicycle crank assembly is constructed to achieve high strength and to suppress the decrease in the efficiency of the rotation transmission from the crank member to the sprocket member in a crank assembly in which the sprocket member is movable in the axial direction.

50 Claims, 17 Drawing Sheets

(56) References Cited

U.S. PATENT DOCUMENTS

| | | | | |
|---|---|---|---|---|
| 4,384,865 A * | 5/1983 | Ueno | B62M 9/10 | 474/160 |
| 4,425,824 A * | 1/1984 | Koch | B62M 9/105 | 475/17 |
| 4,493,678 A * | 1/1985 | Husted | B62M 9/08 | 474/164 |
| 4,701,152 A * | 10/1987 | Dutil | B62M 9/123 | 280/236 |
| 4,770,433 A * | 9/1988 | Hartmann | B62M 11/16 | 280/238 |
| 4,790,554 A * | 12/1988 | Siegwart, Jr. | B62M 9/16 | 280/236 |
| 5,073,152 A * | 12/1991 | Browning | B62M 9/125 | 474/162 |
| 5,078,653 A * | 1/1992 | Nagano | B62M 9/10 | 474/160 |
| 5,085,621 A * | 2/1992 | Nagano | B62M 9/10 | 474/160 |
| 5,087,226 A * | 2/1992 | Nagano | B62M 9/10 | 474/160 |
| 5,127,884 A * | 7/1992 | Seymour | F16H 7/06 | 474/155 |
| 5,152,720 A * | 10/1992 | Browning | B62M 9/1242 | 474/80 |
| 5,162,022 A * | 11/1992 | Kobayashi | B62M 9/10 | 474/155 |
| 5,188,569 A * | 2/1993 | Kobayashi | B62M 9/10 | 474/160 |
| 5,192,249 A * | 3/1993 | Nagano | B62M 9/10 | 474/160 |
| 5,205,794 A * | 4/1993 | Browning | B62M 9/14 | 474/160 |
| 5,207,119 A * | 5/1993 | Garneau | B62M 3/04 | 475/331 |
| 5,303,942 A * | 4/1994 | Schlumpf | B62M 11/145 | 280/236 |
| 5,314,366 A * | 5/1994 | Palm | B62M 9/105 | 474/152 |
| 5,316,327 A * | 5/1994 | Bell | B62M 17/00 | 280/260 |
| 5,354,243 A * | 10/1994 | Kriek | B62M 9/14 | 474/135 |
| 5,413,534 A * | 5/1995 | Nagano | B62M 9/105 | 474/160 |
| 5,426,997 A * | 6/1995 | Brion | B62M 9/105 | 192/64 |
| 5,441,130 A * | 8/1995 | Ha | F16D 41/067 | 188/82.84 |
| 5,458,543 A * | 10/1995 | Kobayashi | B62M 9/10 | 474/160 |
| 5,464,373 A * | 11/1995 | Leng | B62M 9/105 | 474/140 |
| 5,733,215 A * | 3/1998 | Hsu | B62M 9/10 | 474/160 |
| 5,921,363 A * | 7/1999 | Chiang | B62M 9/10 | 192/46 |
| 5,935,033 A * | 8/1999 | Tseng | B62M 9/105 | 474/116 |
| 5,971,878 A * | 10/1999 | Leng | F16H 55/30 | 474/160 |
| 6,099,009 A * | 8/2000 | Schroeder | B62M 1/12 | 280/234 |
| 6,102,821 A * | 8/2000 | Nakamura | B62M 9/10 | 474/160 |
| 6,139,456 A * | 10/2000 | Lii | B62M 9/10 | 474/152 |
| 6,173,982 B1 * | 1/2001 | Westergard | B62M 9/085 | 280/261 |
| 6,190,275 B1 * | 2/2001 | Ciancio | B62M 9/00 | 474/144 |
| 6,340,338 B1 * | 1/2002 | Kamada | B62M 9/122 | 474/152 |
| 6,666,786 B2 * | 12/2003 | Yahata | B62M 9/105 | 474/152 |
| 7,011,592 B2 * | 3/2006 | Shahana | B62M 9/10 | 474/152 |
| 7,059,983 B2 * | 6/2006 | Heim | B62M 9/138 | 474/78 |
| 7,156,764 B2 * | 1/2007 | Mercat | B62M 9/08 | 474/152 |
| 7,462,120 B1 * | 12/2008 | Thompson | B62M 9/105 | 474/152 |
| 7,699,329 B2 * | 4/2010 | Wesling | B62M 9/16 | 280/260 |
| 7,749,117 B2 * | 7/2010 | Carrasco Vergara | B62M 9/08 | 280/259 |
| 8,092,329 B2 * | 1/2012 | Wickliffe | B62M 9/105 | 474/160 |
| 8,235,849 B2 * | 8/2012 | Cranston | B62J 13/00 | 280/261 |
| 2003/0060316 A1 * | 3/2003 | Jiang | B62M 9/16 | 474/141 |
| 2003/0153423 A1 * | 8/2003 | Smith | B62M 9/10 | 474/160 |
| 2005/0176535 A1 * | 8/2005 | Matsumoto | B62M 9/10 | 474/78 |
| 2005/0282672 A1 * | 12/2005 | Nonoshita | B62M 9/105 | 474/161 |
| 2006/0205549 A1 * | 9/2006 | Nonoshita | B62M 9/105 | 474/160 |
| 2009/0062057 A1 * | 3/2009 | Fujiwara | B62M 11/145 | 475/305 |
| 2010/0051398 A1 * | 3/2010 | Spacek | F16D 65/12 | 188/218 XL |
| 2010/0064845 A1 * | 3/2010 | French | B62M 3/00 | 74/594.2 |
| 2010/0096913 A1 * | 4/2010 | Veux | B60B 27/023 | 301/110.5 |
| 2010/0192722 A1 * | 8/2010 | Shiu | B62K 15/006 | 74/594.7 |
| 2010/0234154 A1 * | 9/2010 | Klieber | B62K 25/286 | 474/80 |
| 2011/0031715 A1 * | 2/2011 | Lin | B62M 1/26 | 280/257 |
| 2011/0121536 A1 * | 5/2011 | Lee | B62M 3/04 | 280/274 |
| 2011/0130233 A1 * | 6/2011 | Tokuyama | B62M 9/10 | 474/116 |
| 2013/0008282 A1 * | 1/2013 | Johnson | B62M 3/00 | 74/594.2 |

\* cited by examiner

BICYCLE CRANK ASSEMBLY

CROSS-REFERENCE TO RELATED APPLICATIONS

This application claims the benefit of U.S. Provisional Application No. 61/970,869, filed on Mar. 26, 2014. The entire disclosure of U.S. Provisional Application No. 61/970,869 is hereby incorporated herein by reference.

BACKGROUND

Field of the Invention

This invention generally relates to a bicycle crank assembly. More specifically, the present invention relates to a bicycle crank assembly having a rotational center axis.

Background Information

Bicycles are conventionally known that are provided with a front sprocket and a plurality of rear sprockets in which gears are shifted with a rear derailleur. When shifting with a rear derailleur, there are cases in which the chain is disposed at an angle with respect to the center plane of the front sprocket between the front sprocket and the rear sprocket. When the chain is disposed at an angle, there is a possibility in which the chain will come off of the front sprocket. Therefore, there is a conventionally known bicycle crank assembly in which disposing the chain at an angle is difficult because the front sprocket is movable in the axial direction so that the chain is unlikely to come off (see for example, U.S. Patent Application Publication No. 2013/0008282A1).

SUMMARY

In a conventional crank assembly, a support axle extending along the rotational center axis is installed to each of the tips of a plurality of spider arms to which sprocket members of the crank member are attached, and the sprocket member is supported to the support axle to be movable in the axial direction. Additionally, in a conventional crank assembly, a technique in which a plurality of groove portions are formed at intervals in the circumferential direction at the proximal end of the crank member of the crank assembly and in which the proximal end parts of the parts of the sprocket that are disposed radially are supported by those groove portions to be movable in the axial direction is also disclosed.

However, since the sprocket is supported by the crank member or the radial part of or the sprocket in both techniques, the strength of the part that supports the sprocket is reduced.

The object of the present invention is to highly maintain the strength of the part that supports the sprocket member in a crank assembly in which the sprocket member is movable in the rotational axis direction.

The bicycle crank assembly according to the present invention has a rotational center axis. The crank assembly comprises a crank member and a sprocket member. The crank member comprises a support portion extending in the axial direction and an arm portion being integrally rotatable around the rotational center axis with the support portion. The sprocket member has a sliding portion extending in the axial direction. The sliding portion is integrally rotatable with respect to the support portion, and is displaceable in the axial direction.

In this crank assembly, when the crank member rotates around the rotational center axis, the sprocket member also rotates around the rotational center axis. At this time, if the chain is disposed at an angle and a force in the axial direction acts on the sprocket member due to the tensile force of the chain, the sliding portion of the sprocket member, which is displaceable to the support portion of the crank member in the axial direction, moves in the axial direction, and the degree to which the chain is disposed at an angle decreases. Here, since the support portion and the sliding portion extend and slide in the axial direction, the strength of the part that supports the sprocket member can be maintained at a high level.

The crank member preferably comprises an axle mounting hole that is formed with the rotational axle as the center, and the support portion can be formed around the axle mounting hole. In this case, since the support portion is formed, for example, around an axle mounting hole to which the crank axle can be mounted, the strength of the part that supports the sprocket member can be further increased.

The support portion can be disposed radially inward of the sliding portion. In this case, with respect to the sliding portion, the support portion that normally rotates integrally with the crank axle is disposed radially inward, which is the crank axle side, and simplification of the configuration of the crank assembly can be achieved.

The bicycle crank assembly further and preferably comprises at least one rolling member that is disposed between the support portion and the sliding portion. In this case, since the support portion and the sliding portion slide via the rolling member, the sliding resistance decreases, and the sprocket member can slide smoothly with respect to the crank member.

The bicycle crank assembly further and preferably comprises a plurality of rolling members that are disposed between the support portion and the sliding portion, and a retaining member that retains the plurality of rolling members in the circumferential direction at intervals. In this case, since the support portion and the sliding portion slide via a plurality of rolling members, the sliding resistance decreases. Furthermore, since the intervals of the plurality of rolling members in the circumferential direction are retained by the retaining member, the load in the rotating direction can be received evenly in the circumferential direction. For this reason, the sprocket member can slide even more smoothly with respect to the crank member, and the force in the rotating direction can be evenly transmitted from the crank member to the sprocket member.

The rolling member can be a sphere. In this case, since the rolling member is a sphere, the rolling of the rolling member becomes smooth, and the sprocket member can slide even more smoothly with respect to the crank member.

The bicycle crank assembly further comprises a reinforcing member that is disposed in at least one of the support portion and the sliding portion and that slides while being in contact with the rolling member. In this case, since the reinforcing member is disposed in at least one of the support portion and the sliding portion, even if a light material that is less rigid is used for at least one of the support portion and the sliding portion, the part that is in contact with the rolling member is reinforced by the reinforcing member. For this reason, reducing the weight of the bicycle crank assembly is possible.

The hardness of the reinforcing member can be greater than the hardness of at least one of the support portion and the sliding portion to which the reinforcing member is disposed. In this case, even if the rolling member and the reinforcing member come into contact with each other, wearing of the rolling member and the reinforcing member is less likely to occur, and therefore, backlash between the rolling member and the reinforcing member due to wearing can be suppressed.

The crank member preferably comprises an axle mounting hole that is formed with the rotational center axis as the center. The bicycle crank assembly further and preferably comprises a crank axle that is coupled to the axle mounting hole in order to be integrally rotatable with the crank member. In this case, since the crank axle is coupled to the axle mounting hole, mounting the crank assembly to the bicycle becomes easy.

The crank axle can be coupled to the axle mounting hole by press fitting. In this case, since the crank axle is fixed to the axle mounting hole by press fitting in order to be integrally rotatable, the crank axle can be firmly fixed to the crank member, and the mounting of the crank assembly to the bicycle becomes easier.

The crank axle can be coupled to the axle mounting hole by adhesive. In this case, since the crank axle is fixed to the axle mounting hole in order to be integrally rotatable by adhesive, the crank axle can be easily fixed to the crank member, and the mounting of the crank assembly to the bicycle becomes easier.

The crank axle can be detachably coupled to the axle mounting hole. In this case, since the crank axle is detachable from the crank member, replacing only the crank member or the crank axle becomes possible.

The support portion can be installed integrally with the arm portion. In this case, since the support portion is installed integrally with the arm portion, weight reduction can be achieved, and assembling the bicycle crank assembly becomes easy.

The support portion can be installed separately from the arm portion. In this case, since the support portion and the arm portion are separate portions, replacing only the support portion or the arm portion becomes possible.

The bicycle crank assembly further preferably comprises a dust cover that covers a gap between the support portion and the sliding portion. In this case, since the gap between the support portion and the sliding portion is covered, foreign matter, such as liquid, dust, etc., has difficulty in entering the area between the support portion and the sliding portion.

The bicycle crank assembly further comprises a movement amount adjusting mechanism that can adjust an amount of movement of the sliding portion in the axial direction with respect to the support portion. In this case, since the amount of movement in the axial direction can be adjusted, the amount of movement of the sliding portion can be adjusted according to the number of the plurality of rear sprockets, as well as to the position of the sprocket member and the plurality of rear sprockets in the axial direction.

The bicycle crank assembly further and preferably comprises a backlash removing mechanism for removing backlash from the support portion and the sliding portion in the radial direction. In this case, even if backlash is generated due to the wearing of at least one of the rolling member, the support portion, and the sliding portion, this backlash can be removed.

The sprocket member further and preferably comprises a sprocket main body that is coupled to the sliding portion in order to be integrally rotatable as well as detachable. In this case, since the sprocket main body becomes replaceable, this body can be easily replaced with a sprocket main body that has a different number of teeth. Additionally, maintaining the sprocket main body becomes easy.

The bicycle crank assembly further and preferably comprises a tool-free stopper member that will fix the sprocket main body with respect to the sliding portion in the axial direction and with which a manual detaching operation of the sprocket main body with respect to a sliding portion is possible. In this case, since the tool-free stopper member can be attached and detached without using a tool when attaching and detaching the sprocket main body, the sprocket main body can be easily attached and detached.

The sliding portion preferably comprises a mounting groove on the outer peripheral surface that extends in the circumferential direction, and the tool-free stopper member preferably comprises an annular spring section and a pair of operating handles. The annular spring section is mountable to the mounting groove and is formed to have a smaller diameter than the mounting diameter of the mounting groove in a free state. The pair of operating handles extends radially outward from both ends of the annular spring section and can manually expand the diameter of the annular spring section to be wider than the mounting groove. In this case, the tool-free stopper member can be detached by holding the pair of operating handles with, for example, the thumb and the forefinger.

A bicycle crank assembly according to another aspect of the present invention comprises a rotational center axis. The bicycle crank assembly comprises a crank member, a sprocket member, a sliding mechanism, and a movement amount adjusting mechanism. The crank member is rotatable around the rotational center axis. The sprocket member is integrally and rotatably attached to the crank member. The sliding mechanism couples the sprocket member movably in the axial direction with respect to the crank member. The movement amount adjusting mechanism can adjust the amount of movement of the sliding mechanism.

In this crank assembly, when the crank member rotates around the rotational center axis, the sprocket member also rotates around the rotational center axis. At this time, if the chain is disposed at an angle and a force in the axial direction acts on the sprocket member due to the tensile force of the chain, the sprocket member moves in the axial direction due to the sliding mechanism, and the degree to which the chain is disposed at an angle decreases. The amount of movement of this sliding mechanism can be adjusted by the movement amount adjusting mechanism. Here, the amount of movement of the sliding portion can be adjusted according to the number of the plurality of rear sprockets, as well as the position of the sprocket member and the plurality of rear sprockets in the axial direction.

A bicycle crank assembly according to yet another aspect of the present invention comprises a rotational center axis. The bicycle crank assembly comprises a crank member, a sprocket member, a sliding mechanism, and a dust cover. The crank member is rotatable around the rotational center axis. The sprocket member is integrally and rotatably attached to the crank member. The sliding mechanism couples the sprocket member movably in the axial direction with respect to the crank member. The dust cover covers both ends of the sliding mechanism in the axial direction.

In this crank assembly, when the crank member rotates around the rotational center axis, the sprocket member also rotates around the rotational center axis. At this time, if the chain is disposed at an angle and a force in the axial direction acts on the sprocket member due to the tensile force of the chain, the sprocket member moves in the axial direction due to the sliding mechanism, and the degree to which the chain is disposed at an angle decreases. Here, both ends of the sliding mechanism in the axial direction are covered by the dust cover. For this reason, foreign matter, such as liquid, dust, etc., has a more difficulty in entering the area inside of the sliding mechanism.

A part of the sliding mechanism can be integrally installed with the crank member. In this case, since a part of the sliding mechanism is installed in the crank member, a reduction in weight can be achieved, and the assembly of the bicycle crank assembly becomes easy.

The sliding mechanism can be installed separately from the crank member. In this case, since the sliding mechanism and the crank member are separate portions, replacing only the sliding mechanism or the crank member becomes possible.

A bicycle crank assembly according to yet another aspect of the present invention comprises a rotational center axis. The bicycle crank assembly comprises a crank member, a sprocket member, a sliding mechanism, and a backlash removing mechanism. The crank member is rotatable around the rotational center axis. The sprocket member is integrally and rotatably attached to the crank member. The sliding mechanism couples the sprocket member movably in the axial direction with respect to the crank member. The backlash removing mechanism is a mechanism for removing the backlash of the sliding mechanism in the radial direction.

In this crank assembly, when the crank member rotates around the rotational center axis, the sprocket member also rotates around the rotational center axis. At this time, if the chain is disposed at an angle and a force in the axial direction acts on the sprocket member due to the tensile force of the chain, the sprocket member moves in the axial direction due to the sliding mechanism, and the degree to which the chain is disposed at an angle decreases. Here, backlash can be removed even if the members that constitute the sliding mechanism are worn due to sliding and if backlash occurs.

A bicycle crank assembly according to yet another aspect of the present invention has a rotational center axis. The bicycle crank assembly comprises a crank member, a sprocket member, and a tool-free stopper member. The crank member is rotatable around the rotational center axis. The sprocket member is integrally and rotatably attached to the crank member. The tool-free stopper member can fix the sprocket member in the axial direction with respect to the crank member, and the sprocket member can be detached manually without having to use a tool.

In this crank assembly, since the tool-free stopper member can be attached and detached without using a tool when attaching and detaching the sprocket member, the sprocket member can be easily attached and detached.

The crank member preferably has a mounting groove that extends in the circumferential direction, and the tool-free stopper member preferably comprises an annular spring section and a pair of operating handles. The annular spring section can be mounted to the mounting groove and is formed to have a smaller diameter than the mounting diameter of the mounting groove in a free state. The pair of operating handles extends radially outward from both ends of the annular spring section and can manually expand the diameter of the annular spring section to be wider than the mounting groove. In this case, the tool-free stopper member can be detached by holding the pair of operating handles with, for example, the thumb and the forefinger.

A bicycle crank assembly according to yet another aspect of the present invention has a rotational center axis. The bicycle crank assembly comprises a crank member, a sprocket member, a sliding mechanism, a first stopper member, a second stopper member and a damping member. The crank member is rotatably arranged around the rotational center axis. The sprocket member is integrally and rotatably attached to the crank member. The sliding mechanism movably couples the sprocket member in an axial direction with respect to the crank member. The first stopper member is attached to the crank member. The second stopper member is attached to the sprocket member. The damping member is attached to at least one of the first stopper member and the second stopper member. The damping member is configured to contact the other of the first stopper member and the second stopper member while the sliding mechanism is in operation.

The damping member is preferably made of an elastic material. The damping member is more preferably made of urethane.

The damping member is preferably attached to the at least one of the first stopper member and the second stopper member by adhesive.

The first stopper member and the second stopper member constitute a movement amount adjusting mechanism selectively adjusting an amount of movement of the sliding mechanism.

BRIEF DESCRIPTION OF THE DRAWINGS

Referring now to the attached drawings which form a part of this original disclosure.

DETAILED DESCRIPTION OF EMBODIMENTS

Figure 1:
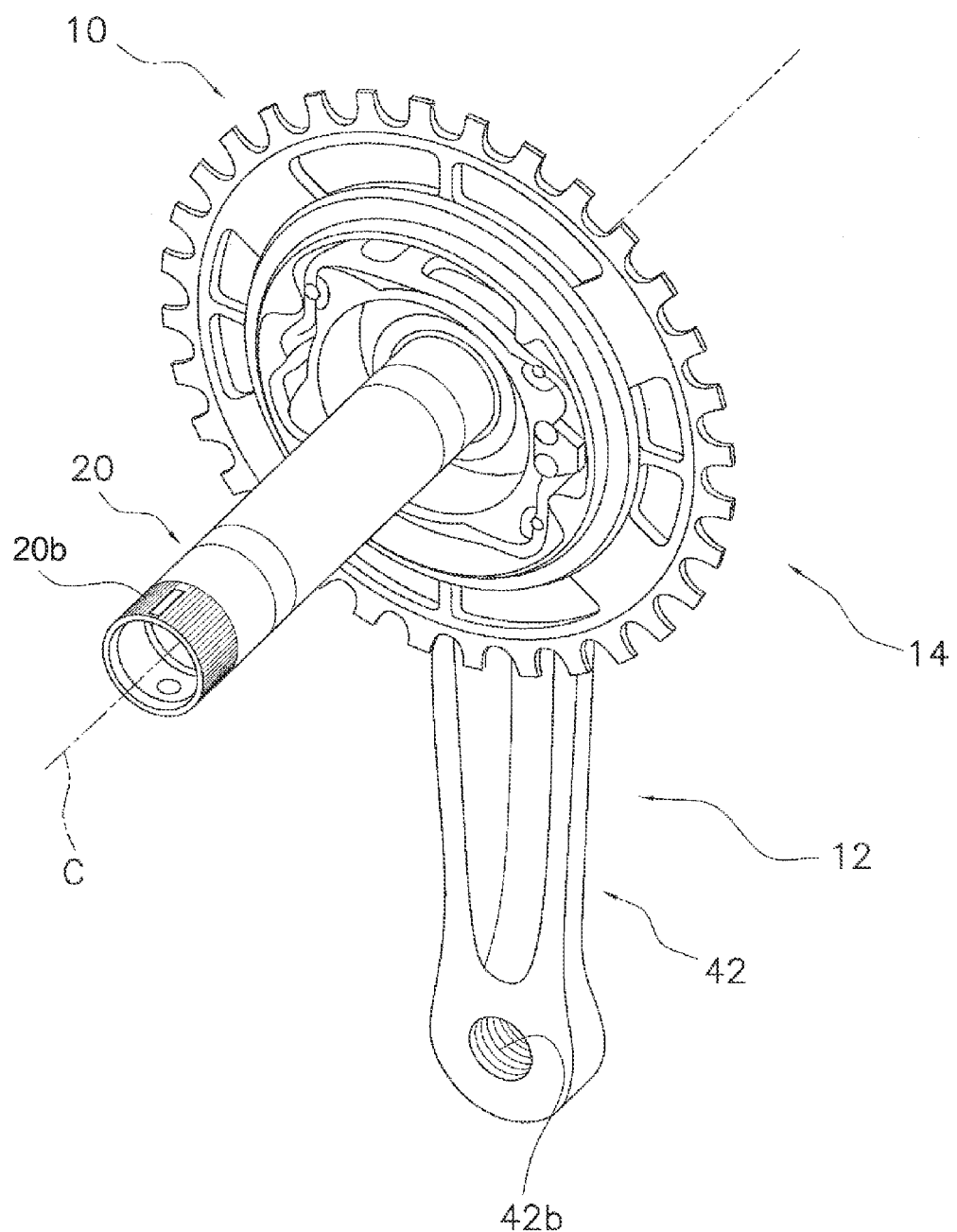
FIG. 1 is a rear perspective view of the bicycle crank assembly according to a first embodiment of the present invention.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Referring initially to FIGS. 1 to 5, a bicycle crank assembly 10 is illustrated in accordance with a first embodiment. The bicycle crank assembly 10 will be hereinafter referred to as the crank assembly. The bicycle crank assembly 10 comprises a rotational center axis C. The crank assembly 10 comprises a crank member 12 and a sprocket member 14. Additionally, the crank assembly 10 further and preferably comprises a crank axle 20, at least one rolling member 22, a retaining member 24, a plurality of reinforcing members 26, a dust cover 28, a movement amount adjusting mechanism 30, a backlash removing mechanism 32 and a tool-free stopper member 34. If necessary, the crank axle 20, the at least one rolling member 22, the retaining member 24, the reinforcing members 26, the dust cover 28, the movement amount adjusting mechanism 30, the backlash removing mechanism 32, and the tool-free stopper member 34 can be selectively omitted.

Figure 3:
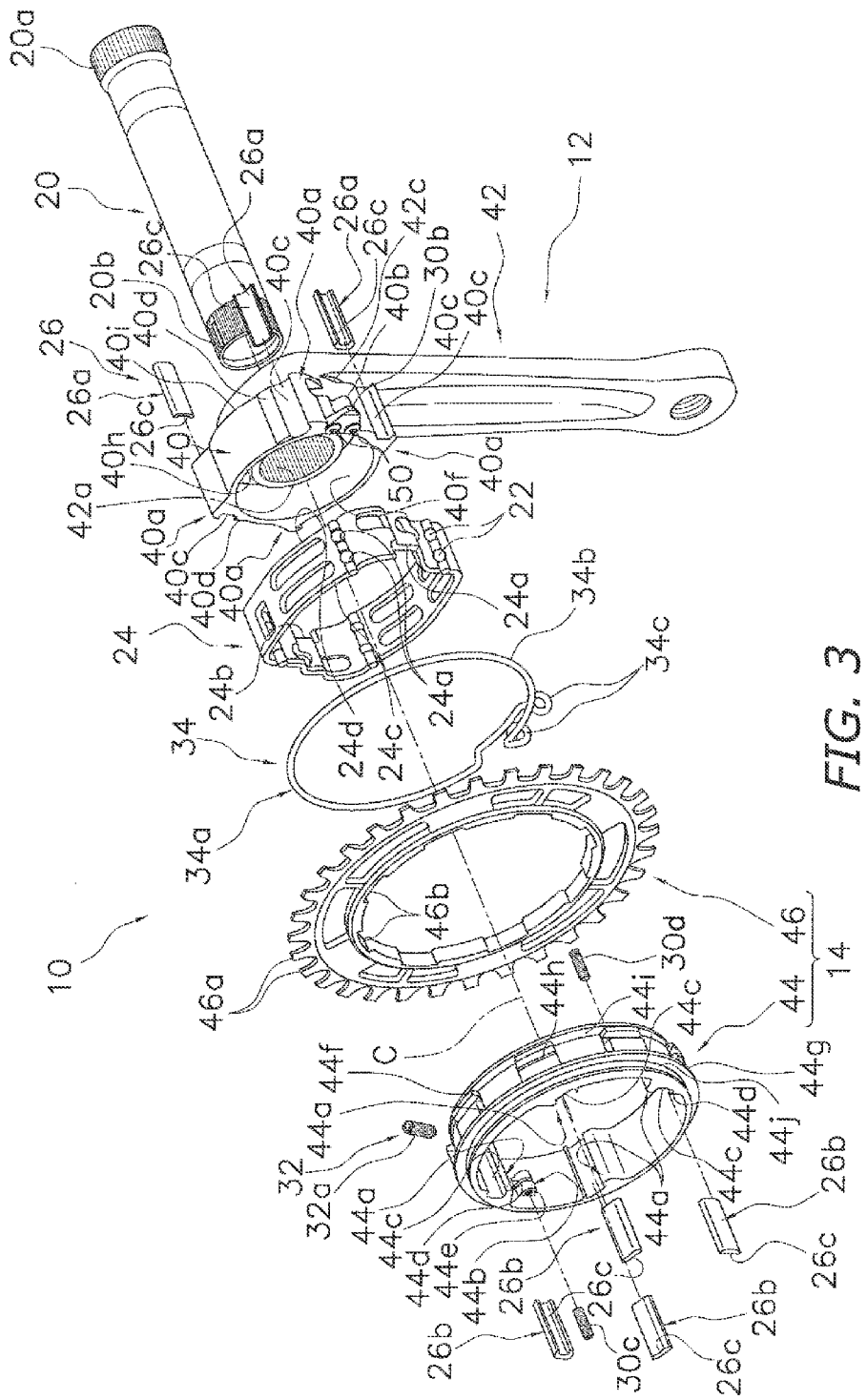
FIG. 3 is an exploded perspective view of the bicycle crank assembly illustrated in FIGS. 1 and 2.
Figure 4:
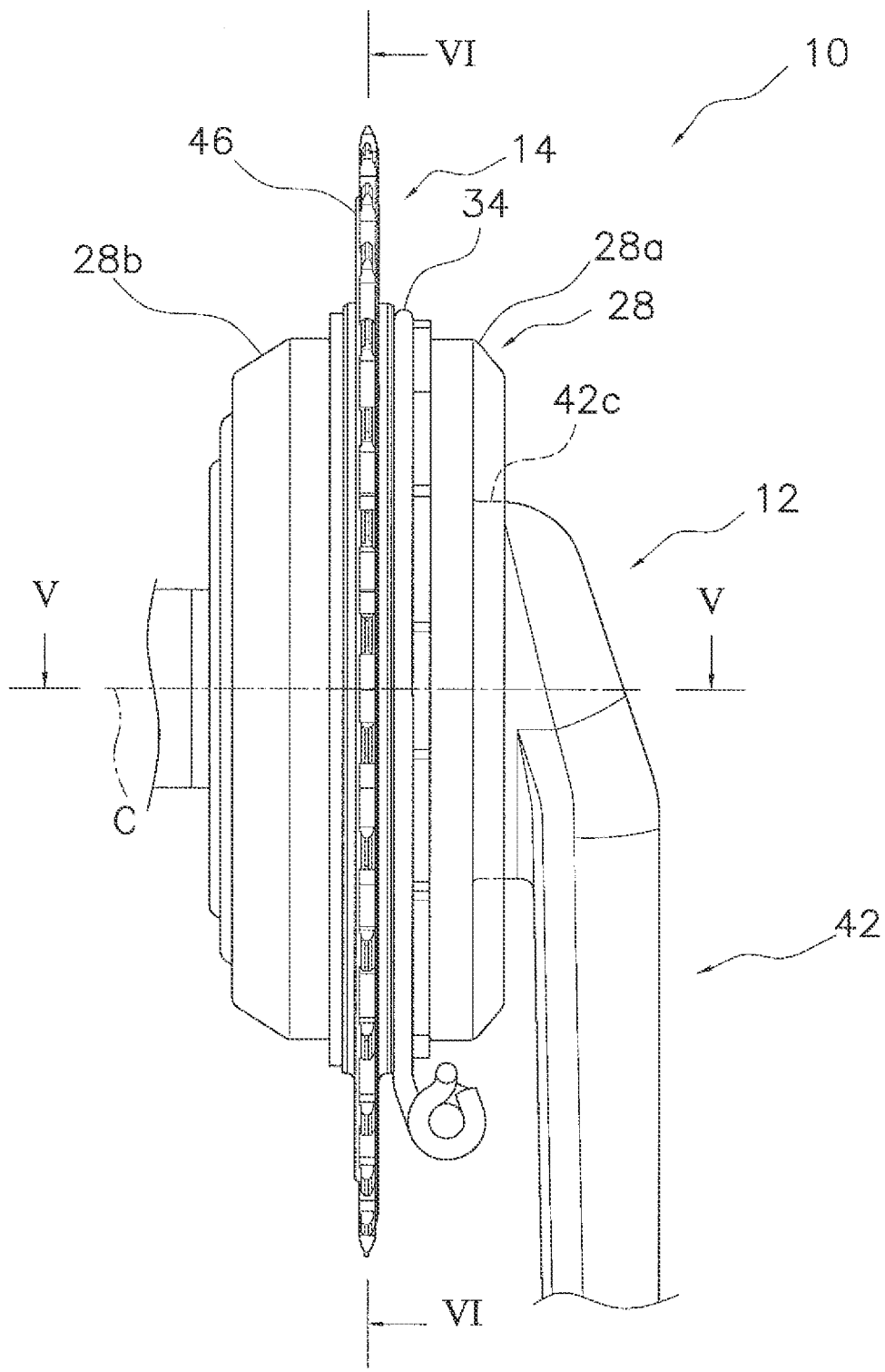
FIG. 4 is an enlarged side elevational view of the bicycle crank assembly illustrated in FIGS. 1 to 3.
Figure 6:
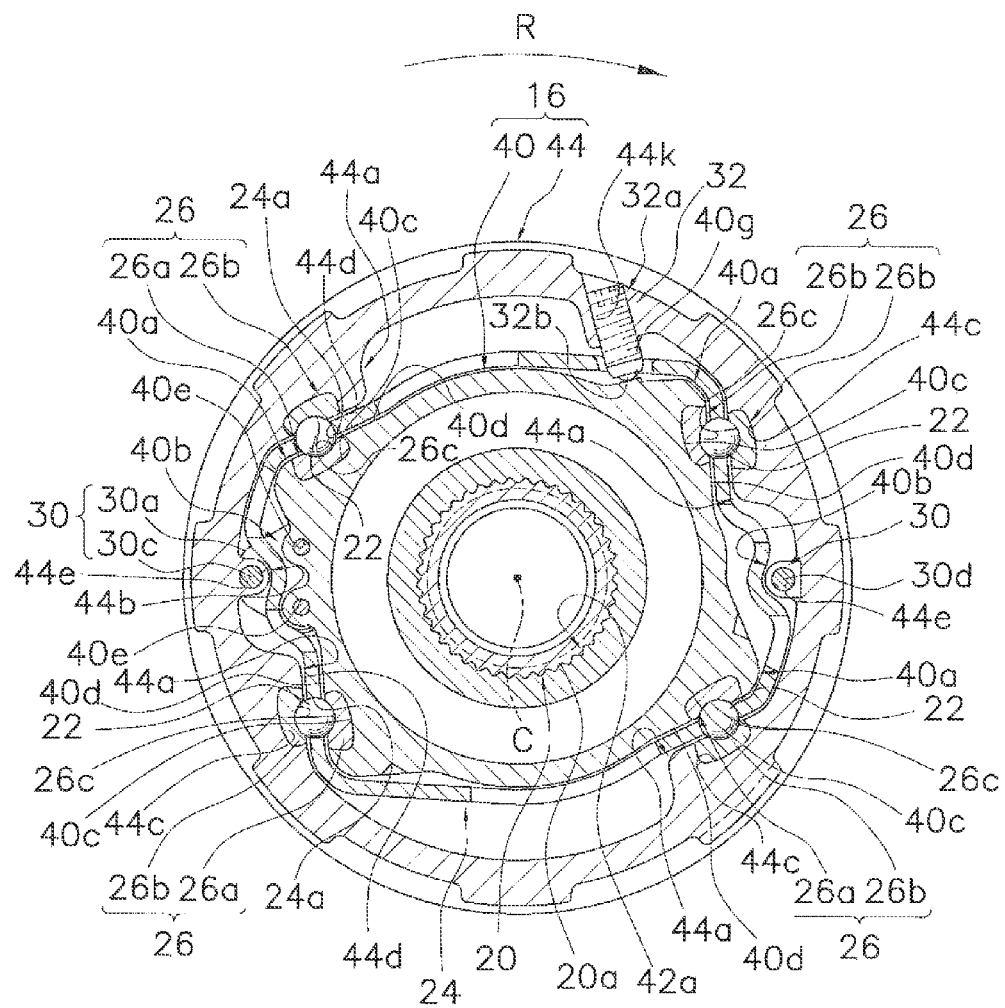
FIG. 6 is a cross-sectional view of the bicycle crank assembly taken along section line VI-VI of FIG. 4.

The crank member 12 is, for example, a member made of a light metal, such as aluminum, etc. The crank member 12 comprises a generally tubular support portion 40, an arm portion 42 and an axle mounting hole 42a. The generally tubular support portion 40 extends in the direction of the rotational center axis C. The arm portion 42 integrally rotates with the support portion 40 around the rotational center axis C. The axle mounting hole 42a is formed with the rotational center axis C as being the center. In the first embodiment, the support portion 40 is integrally installed with the arm portion 42. On the outer peripheral surface of the support portion, as shown in FIGS. 3 and 6, are formed a plurality of (for example, four) first protrusions 40a and a plurality of second protrusions 40b. The first protrusions 40a are formed protruding radially outward from the outer peripheral surface of the support portion 40. The first protrusions 40a are formed along the entire length of the outer peripheral surface of the support portion 40 in the direction of the rotational center axis C. The first protrusion 40a has a plurality of first mounting recesses 40c formed thereon for mounting the first reinforcing member 26a mentioned below. In the present embodiment, the first mounting recess 40c is formed on a slope 40d that is radially inward of the most protruded part, rather than on the most protruded part of the first protrusion 40a. The slope 40d is formed to intersect with the circumferential direction so that the crank assembly 10 can press against the sliding portion 44 when rotating in the driving direction R. With this, the torque of the support portion 40 can be efficiently transmitted to the sliding portion 44. The second protrusion 40b is formed protruding radially outward of each of the one end and the other end of the two ends of the support portion 40 in the direction of the rotational center axis C. The second protrusion 40b on the one end side and the second protrusion 40b on the other end side are disposed with a 180-degree interval between them in the circumferential direction. The second protrusions 40b each has two screw holes 40e. A screw member 50 is screwed into each of the screw holes 40e to fix a first regulating (stopper) member 30a and a second regulating (stopper) member 30b. The first and second regulating members 30a and 30b constitute the movement amount adjusting mechanism 30.

Figure 2:
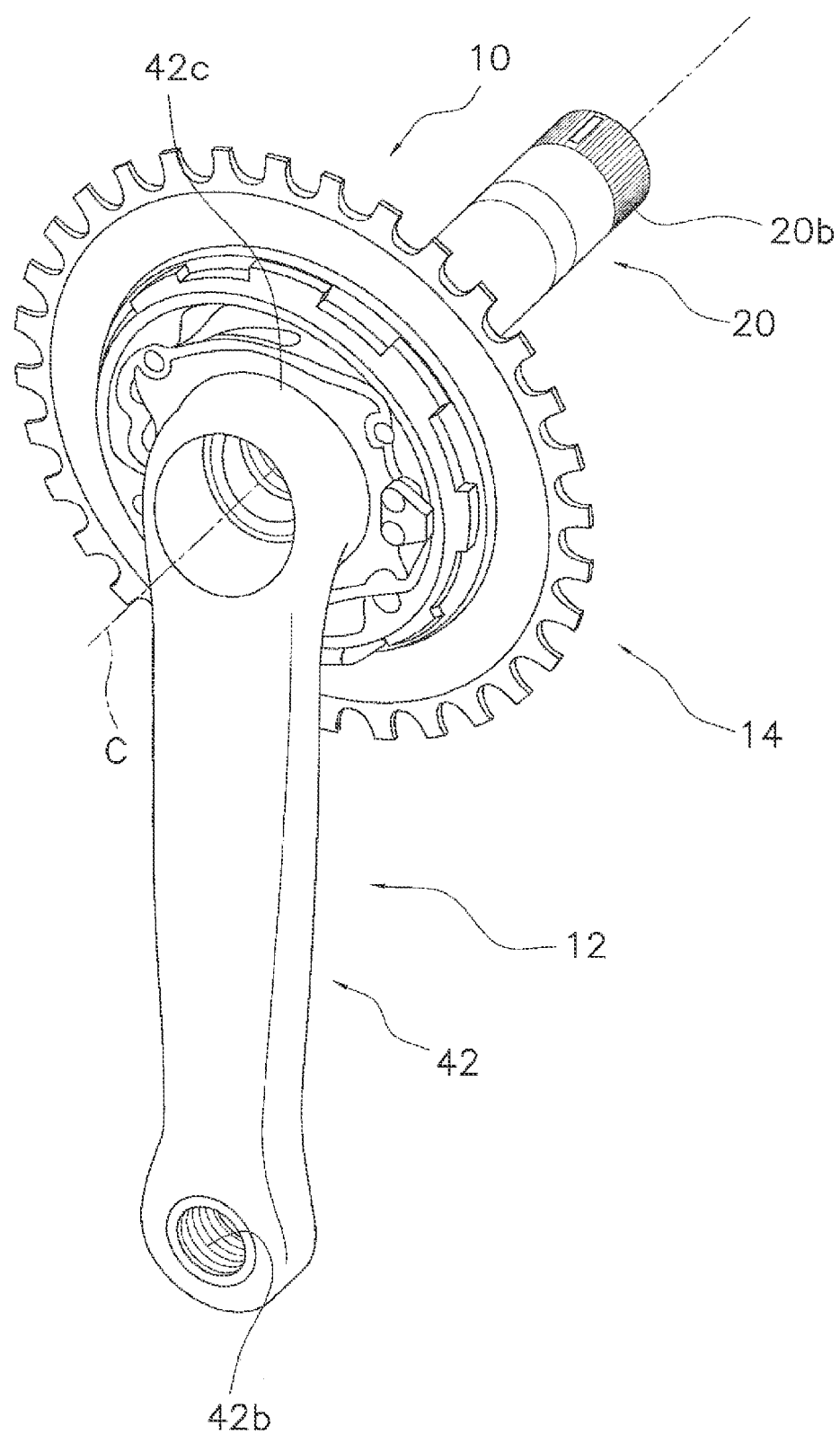
FIG. 2 is a front perspective view of the bicycle crank assembly illustrated in FIG. 1.

The arm portion 42 constitutes a crank arm that extends in the radial direction of the rotational center axis C. On the proximal end of the arm portion 42 is formed a axle mounting hole 42a. As shown in FIGS. 1 and 2, a pedal mounting hole 42b for mounting a pedal is formed on the distal end of the arm portion 42 in the form of a female screw hole. Meanwhile, in FIGS. 1 to 3, the diagram for the dust cover 28 has been omitted.

The sprocket member 14 is a member made of a light metal, for example, aluminum, etc. The sprocket member 14 comprises a sliding portion 44 and a sprocket main body 46. The sliding portion 44 extends in the direction of the rotational center axis C to be integrally rotatable with the support portion 40 and is also displaceable in the direction of the rotational center axis C. The support portion 40 and the sliding portion 44 constitute the sliding mechanism 16.

Figure 5:
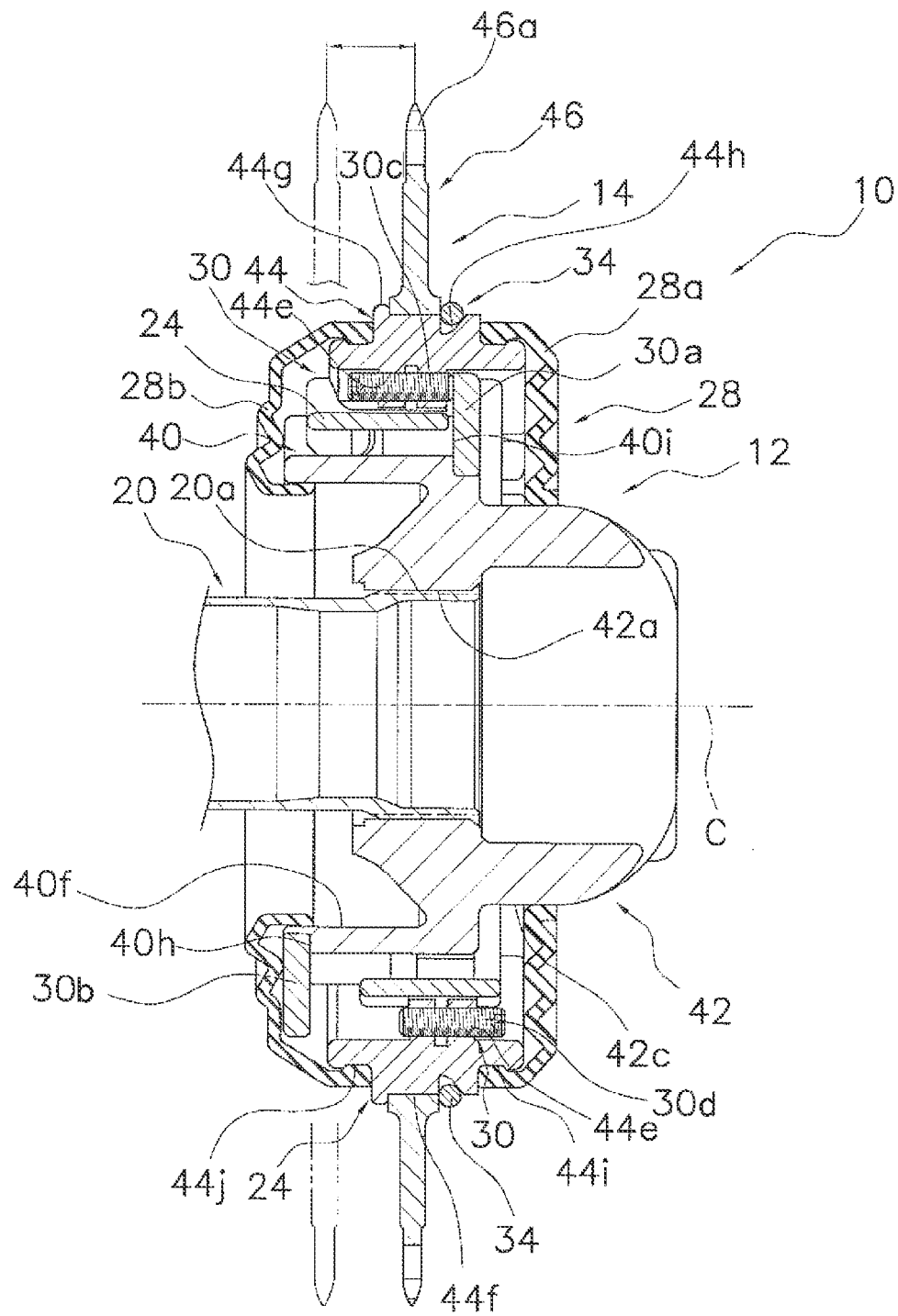
FIG. 5 is a cross-sectional view of the bicycle crank assembly taken along section line V-V of FIG. 4.

The sliding portion 44, as shown in FIGS. 3, 5 and 6, is a tubular member that is disposed radially outward of the support portion 40. In other words, the support portion 40 is disposed radially inward of the sliding portion 44. The support portion can also be disposed radially outward of the sliding portion 44. On the inner peripheral surface of the sliding portion 44 are formed a plurality of (for example, four) third protrusions 44a and a plurality of (for example, two) fourth protrusions 44b. The third protrusion 44a is formed protruding radially inward at a prescribed interval with the first protrusion 40a. With this, a retaining member 24 can be disposed between the third protrusion 44a and the first protrusion 40a. The third protrusions 44a are formed along the entire length of the inner peripheral surface of the sliding portion 44 in the direction of the rotational center axis C. A plurality of second mounting recesses 44c are formed on the third protrusion 44a for mounting the second reinforcing member 26b mentioned below. The second mounting recess 44c is disposed in a position facing the first mounting recess 40c. In the present embodiment, the second mounting recess 44c is formed on a slope 44d that is radially outward of the most protruded part, rather than on the most protruded part of the third protrusion 44a. The slope 44d is disposed facing the slope 40d. Each of the fourth protrusions 44b has a screw hole 44e to which a corresponding one of the adjusting members 30c and 30d of the movement amount adjusting mechanism 30 is screwed.

The sliding portion 44, as shown in FIG. 3, has a plurality of (for example, eight) coupling protrusions 44f on the outer peripheral surface for coupling the sprocket main body 46 in order to be integrally rotatable and detachable. The coupling protrusions 44f are formed at regular intervals or at irregular intervals in the circumferential direction. In this embodiment, the coupling protrusions 44f are formed at regular intervals, but they can also be at irregular intervals. Additionally, the sliding portion 44 comprises a positioning protrusion 44g and a mounting groove 44h. The positioning protrusion 44g is arranged for positioning the sprocket main body 46 on the outer peripheral surface in the direction of the rotational center axis C. The mounting groove 44*h* is configured for mounting the tool-free stopper member 34. The positioning protrusion 44*g* can be any shape as long as the protrusion can position the mounting direction of the sprocket main body 46. In the present embodiment, the positioning protrusion 44*g* is formed in an annular shape, but a plurality of positioning protrusions can be disposed at intervals in the circumferential direction. Also, there can be only one positioning protrusion. The mounting groove 44*h* extends in an arc-shape along the circumferential direction of the positioning protrusions 44*g*. When the tool-free stopper member 34 is mounted to the mounting groove 44*h*, the sprocket main body 46 that is positioned by the positioning protrusion 44*g* is stopped in the direction of the rotational center axis C.

The sprocket main body 46 comprises a plurality of sprocket teeth 46*a* on the outer peripheral part, as shown in FIG. 3. The sprocket main body 46 is coupled with the sliding portion 44 in order to be integrally rotatable as well as detachable. In the inner peripheral part, the sprocket main body 46 comprises a plurality of (for example, eight) coupling recesses 46*b* that engage with the coupling protrusions 44*f* so that they are integrally rotatable as well as detachable.

The crank axle 20 is a tubular shaft member that is rotatably supported by a bottom bracket, which is not diagrammed. On one end, the crank axle 20 comprises a first engaging section 20*a* that engages with the axle mounting hole 42*a* of the arm portion 42 in order to be integrally rotatable; on the other end, a second engaging section 20*b* engages with a left crank not diagrammed in order to be integrally rotatable. The first engaging section 20*a* is larger in diameter than the second engaging section 20*b* and is serration engaged with, as well as pressed fitted to, the axle mounting hole 42*a*. The second engaging section 20*b* is serration engaged with, as well as being detachably fixed by a screw member to, the left crank. Therefore, in the first embodiment, the crank axle 20 is coupled to the axle mounting hole 42*a* by press fitting. Meanwhile, the crank axle 20 can also be coupled to the axle mounting hole 42*a* by adhesive.

As shown in FIGS. 3 and 6, at least one rolling member 22 is disposed between the support portion 40 and the sliding portion 44. In the present embodiment, there is a plurality of rolling members 22. Specifically, two rolling members 22 are disposed in a row in the direction of the rotational center axis C, and four are disposed in the circumferential direction at intervals. Therefore, in the present embodiment, eight rolling members 22 are used. The rolling member 22 is a sphere. The rolling member 22 can also be needle-shaped or roller-shaped.

The retaining member 24 is a member made of an edgeless metal plate. The retaining member 24 can be configured by a non-metallic material, such as synthetic resin, etc. The retaining member 24 retains the plurality of rolling members 22 at intervals in the circumferential direction. In the present embodiment, the retaining member 24 comprises a retaining hole 24*a* that retains multiple (for example, two) rolling members 22 at intervals in the direction of the rotational center axis C as well. The retaining hole 24*a* is installed in order to hold the rolling member 22 while enabling rolling of the rolling member 22. The retaining member 24 is disposed between the support portion 40 and the sliding portion 44. The movement of the retaining member 24 in the direction of the rotational center axis C is restricted by the first regulating member 30*a* and the second regulating member 30*b* described below. A generally rectangular notched section 24*b* is formed in positions that are phase shifted by 180 degrees on a first end portion 24*c* of the retaining member 24 (the left end in FIG. 3) and on a second end portion 24*d* on the opposite side of the first end portion 24*c* in the direction of the rotational center axis C (the right end in FIG. 3). The movement of the retaining member 24 in the axial direction is restricted by the first regulating member 30*a* coming into contact with this notched section 24*b*.

The reinforcing member 26 is preferably made from an iron-based alloy, such as stainless steel. The reinforcing member 26 is disposed in at least one, and preferably both, of the support portion 40 and the sliding portion 44 and slides to come into contact with the rolling member 22. The hardness of the reinforcing member 26 is preferably greater than the hardness of at least one of the support portion 40 and the sliding portion 44, in which the reinforcing member 26 is disposed. With this, even if a light metal that is not hard is used as the support portion 40 and the sliding portion 44, the reinforcing member 26 with a greater hardness will come into contact with the rolling member 22. For this reason, even when the sliding portion 44 slides, backlash due to wearing is less likely to occur.

In this embodiment, the reinforcing member 26 comprises a first reinforcing member 26*a* and a second reinforcing member 26*b*. The first reinforcing member 26*a* is disposed in the support portion 40. The second reinforcing member 26*b* is disposed in the sliding portion 44. The first reinforcing member 26*a* and the second reinforcing member 26*b* are generally the same shape. The first reinforcing member 26*a* is fixed to the first mounting recess 40*c* by an appropriate fixing means, such as adhesive or press fitting, etc. The longitudinal length of the first reinforcing member 26*a* along the rotational center axis C is preferably the same as the length of the support portion 40 in the direction of the rotational center axis C. The second reinforcing member 26*b* is fixed to the second mounting recess 44*c* by an appropriate fixing means, such as adhesive or press fitting, etc. The longitudinal length of the second reinforcing member 26*b* along the rotational center axis C is preferably the same as the length of the sliding portion 44 in the direction of the rotational center axis C. Both the first reinforcing member 26*a* and the second reinforcing member 26*b* have a sliding groove 26*c* that contacts with the rolling member 22. The sliding groove 26*c* of the first reinforcing member 26*a* and the sliding groove 26*c* of the second reinforcing member 26*b* are disposed opposing the inner peripheral side and the outer peripheral side, and contact with the rolling member 22. The sliding groove 26*c* is an arc-shaped groove with a cross-sectional radius that is essentially the same as or slightly larger than the radius of the sphere of the rolling member 22 and is formed along the entire length of the first reinforcing member 26*a* and the second reinforcing member 26*b* in the longitudinal direction. With this, the sliding portion 44 moves smoothly along the rotational center axis C direction with respect to the support portion 40. Meanwhile, in FIG. 1, FIG. 2, and FIG. 3, the diagram for the dust cover has been omitted.

The dust cover 28 is preferably a member made of an elastic body, such as synthetic rubber, etc. The dust cover 28 covers the gap between the support portion 40 and the sliding portion 44. As shown in FIG. 5, in the present embodiment, the dust cover 28 is a bottomed cylindrical shape having a circular opening. The dust cover 28 is a sealing member that employs a bellows structure and that has elasticity in the direction of the rotational center axis C. The dust cover 28 comprises a first dust cover 28*a* and a second dust cover 28*b*. The first dust cover 28*a* covers one end of the arm portion 42 side of the support portion 40. The second dust cover 28*b* covers the other end of the support portion 40. The outer peripheral part of the first dust cover 28*a* is mounted to a first annular recess 44*i* that is formed on the outer peripheral surface of the arm portion 42 side of the sliding portion 44. The inner peripheral part of the first dust cover 28*a* contacts with a circular part 42*c* on the proximal end side of the arm portion 42. The outer peripheral part of the second dust cover 28*b* is mounted to a second annular recess 44*j* that is formed on the outer peripheral surface of the sliding portion 44 on the opposite side of the first annular recess 44*i* in the direction of the rotational center axis C. The inner peripheral part of the second dust cover 28*b* contacts with the inner peripheral surface 40*f* of the support portion 40. With the dust cover 28, foreign matter can be prevented from entering the area between the support portion 40 and the sliding portion 44.

The movement amount adjusting mechanism 30 is a mechanism that can adjust the amount of movement (the stroke) of the sliding portion 44 in the direction of the rotational center axis C with respect to the support portion 40. In the present embodiment, the movement amount adjusting mechanism 30 can, for example, move the sliding portion 44 by a maximum of around 10 mm in the direction of the rotational center axis C with respect to the support portion 40. The movement amount adjusting mechanism 30, as described above, comprises the first regulating member 30*a* and the second regulating member 30*b* that are fixed to the support portion 40. The movement amount adjusting mechanism 30 further comprises a first adjusting (stopper) member 30*c* and a second adjusting (stopper) member 30*d*. The first adjusting member 30*c* is installed in the sliding portion 44 to abut the first regulating member 30*a*. The second adjusting member 30*d* is installed in the sliding portion. 44 to abut the second regulating member 30*b*. The first regulating member 30*a* is disposed on a first end 40*h* of the support portion 40 (the left end in FIG. 5). The second regulating member 30*b* is disposed on a second end 40*i* of the support portion 40 (the right end in FIG. 5) that is on the opposite side of the first end 40*h* in the direction of the rotational center axis C with the phase being shifted 180 degrees from the first regulating member 30*a*. Additionally, the first regulating member 30*a* and the second regulating member 30*b*, as described above, restrict the movement of the retaining member 24 in the direction of the rotational center axis C. With this arrangement, in the present embodiment, the retaining member 24 will move only slightly even if the sliding portion 44 moves in the direction of the rotational center axis C with respect to the support portion 40 and essentially does not move.

The first adjusting member 30*c* and the second adjusting member 30*d* are screw members that screw into the screw holes 44*e* of the sliding portion 44. The first adjusting member 30*c* and the second adjusting member 30*d*, in the present embodiment, include, for example, hex socket set screws. The first adjusting member 30*c* can adjust the amount of movement of the sliding portion 44 towards the first end 40*h* of the support portion 40 by protrusion amount of the first adjusting member 30*c* when the first adjusting member 30*c* protrudes from the screw hole 44*e* toward the first regulating member 30*a*. The second adjusting member 30*d* can adjust the amount of movement of the sliding portion 44 toward the second end 40*i* of the support portion 40 by protrusion amount of the second adjusting member 30*d* when the second adjusting member 30*d* protrudes from the screw hole 44*e* toward the second regulating member 30*b*. When the protruding length of the first adjusting member 30*c* (or the second adjusting member 30*d*) is large, the gap between the first adjusting member 30*c* and the first regulating member 30*a* (or the gap between the second adjusting member 30*d* and the second regulating member 30*b*) decreases, so the stroke of the sliding portion 44 decreases. Meanwhile, the dispositions of the first adjusting member 30*c* and the second adjusting member 30*d*, as well as the first regulating member 30*a* and the second regulating member 30*b*, are not limited to the first embodiment. The adjusting members 30*c* and 30*d* can be installed in the support portion 40, and the regulating members 30*a* and 30*b* can be installed in the sliding portion 44.

The backlash removing mechanism 32 is a mechanism for removing the backlash between the support portion 40 and the sliding portion 44 in the radial direction and in the circumferential direction. In other words, the backlash removing mechanism 32 is a mechanism for removing the backlash of the sliding mechanism 16 in the radial direction and in the circumferential direction. The backlash removing mechanism 32, as shown in FIG. 6, comprises a backlash removing member 32*a* that is installed in the sliding portion 44 to be able to contact with the support portion 40. Meanwhile, when the sliding portion is disposed on the inner peripheral side of the support portion, the removing member can be installed in the support portion. In the present embodiment, the backlash removing member 32*a* is a screw member that is mounted to a screw hole 44*k* that is formed in the sliding portion 44 facing the support portion 40. In the present embodiment, the backlash removing member 32*a* includes hex socket set screws. The screw hole 44*k* is formed in an oblique direction that intersects in the radial direction facing the first protrusion 40*a* of the support portion 40. The forming direction of the screw hole 44*k* can be any direction that allows the backlash removing member 32*a* to contact with the support portion 40. The removal member 32*a* comprises a contacting portion 32*b* that is formed protruding in a spherical shape in order to contact with the slope 40*g* of the first protrusion 40*a* on the distal end portion. The slope 40*g* is formed on the first protrusion 40*a* to be essentially perpendicular to the direction in which the backlash removing member 32*a* moves. In a backlash removing mechanism 32 structured in this way, the hit of the rolling member 22 and the sliding groove 26*c* in the radial direction and in the circumferential direction can be adjusted by having the contacting portion 32*b* of the backlash removing member 32*a* contact with the slope 40*g* of the first protrusion 40*a* to slightly press the slope 40*g*. With this, the backlash of the sliding portion 44 with respect to the support portion 40 can be removed, and the sliding portion slides smoothly with respect to the support portion 40. Meanwhile, in the present embodiment, the backlash removing mechanism 32 has been configured to be able to remove backlash of the sliding mechanism 16 in the circumferential direction and in the radial direction; however, the present invention is not limited to this. The backlash removing mechanism 32 just needs to remove the backlash of the sliding mechanism 16 in the radial direction.

The tool-free stopper member 34 is a member that fixes the sprocket main body 46 in the direction of the rotational center axis C with respect to the sliding portion 44 and with which manually detaching the sprocket main body 46 with respect to the sliding portion 44 is possible. The tool-free stopper member 34 includes a retaining ring 34*a* made of a metal wire material that is elastic. The retaining ring 34*a* is formed by bend processing a metal wire. The retaining ring 34*a* comprises an annular spring section 34*b* and a pair of operating handles 34c. The annular spring section 34b can be mounted to the mounting groove 44h that is formed on the outer peripheral surface of the support portion 40. The annular spring section 34b is formed to have a smaller diameter than the mounting diameter of the mounting groove 44h in a free state. The pair of operating handles 34c extends radially outward from both ends of the annular spring section 34b and can manually expand the diameter of the annular spring section 34b to be wider than the mounting groove 44h. In the present embodiment, the annular spring section 34b is disposed so that both ends will overlap in the circumferential direction. The pair of operating handles 34c is formed from an extension that is radially outward from the overlaid two ends of the annular spring section 34b and from the distal end that extends in a direction that is perpendicular to the direction in which the annular spring section 34b extends being bent into a circle. By pinching this pair of operating handles 34c in the approaching direction with the thumb and the forefinger and expanding the diameter of the annular spring section 34b, the tool-free stopper member 34 can be removed from the mounting groove 44h.

Next, the behavior of the crank assembly 10, when the crank assembly 10 according to the first embodiment configured in this way is mounted to a bottom bracket that is mounted to the bicycle, will be explained.

When a chain is mounted to the sprocket main body 46 and a plurality of rear sprockets, and the position of the chain on the rear sprocket in the hub shaft direction is displaced by a shift operation, the sprocket main body 46 moves in the direction that the chain is displaced in the direction of the rotational center axis C due to the tensile force that acts on the chain. For this reason, the state in which the chain is disposed at an angle is relaxed, and the rotation of the sprocket main body 46 is efficiently transmitted to the rear sprocket via the chain.

Since both the sliding portion 44 and the support portion 40 to which is mounted the sprocket main body 46 (that is, the sliding mechanism 16) is configured to extend in the direction of the rotational center axis C, the support portion 40 and the sliding portion 44 can maintain a high strength.

In the case of adjusting the amount of movement of the sliding portion 44, this is adjusted by turning the adjusting member 30d. When the adjusting member 30d is turned in the direction to advance the screw, the amount of movement of the sliding portion 44 decreases. If the adjusting member 30d is turned in the direction to return the screw, the amount of movement of the sliding portion 44 increases. With this, the amount of movement can be adjusted according to the number of rear sprockets, etc.

In the case of removing the sprocket main body 46, the operating handle 34c of the tool-free stopper member 34 is pinched with the fingers, and the annular spring section 34b is expanded to be wider than the coupling protrusion 44f, thereby allowing for the removal of this part from the mounting groove 44h. With this, the sprocket main body 46 can be removed without using a tool.

In the case that the support portion 40 rattles against the sliding portion 44, the removing member 32a is turned in the direction to advance the screw in order to press the slope 40g. With this, the hit of the rolling member 22 and the sliding groove 26c in the radial direction and in the circumferential direction can be adjusted, and the backlash can be removed.

Second Embodiment

Figure 7:
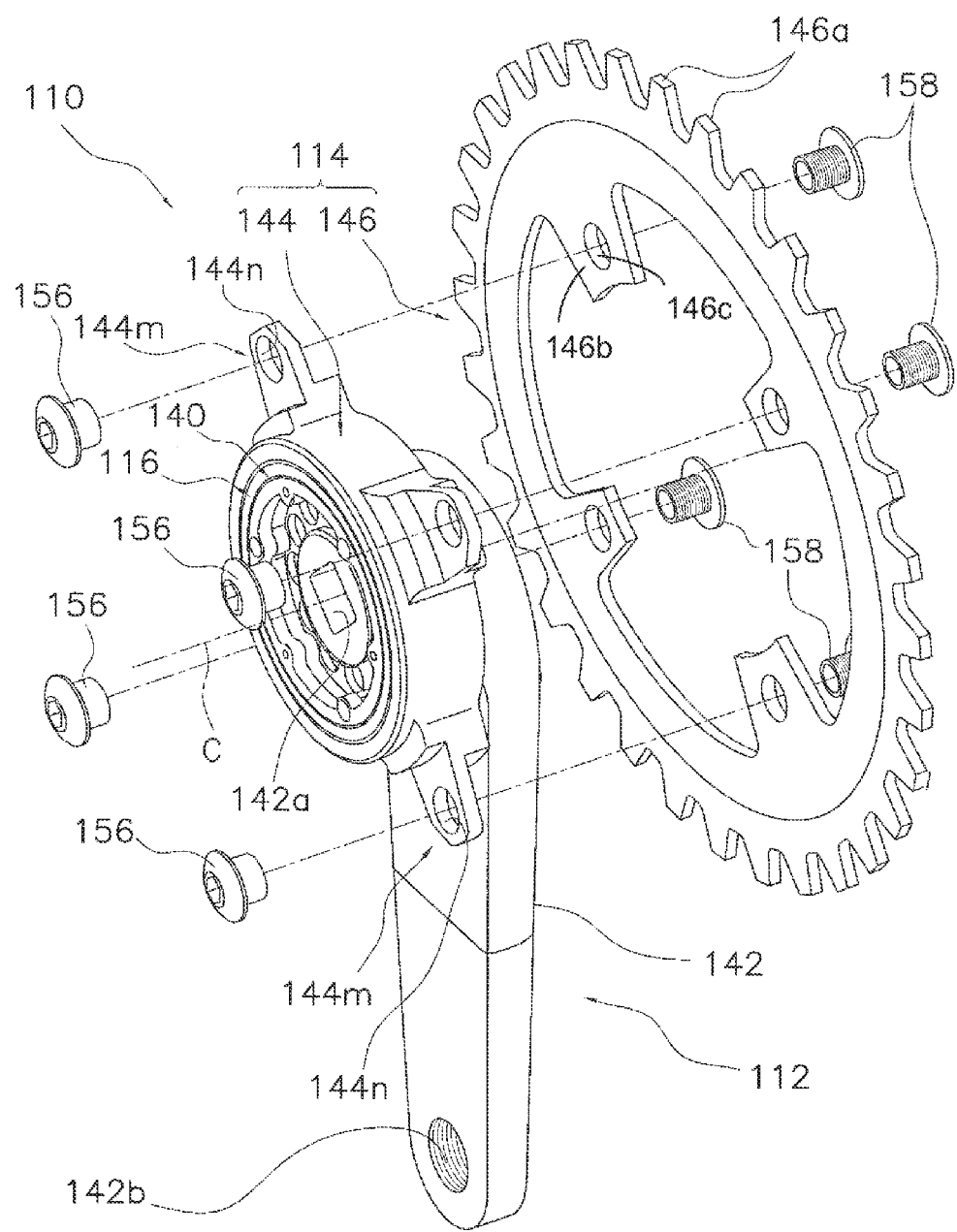
FIG. 7 is a rear perspective view of the bicycle crank assembly in accordance with a second embodiment in a state in which the sprocket member has been taken off.
Figure 8:
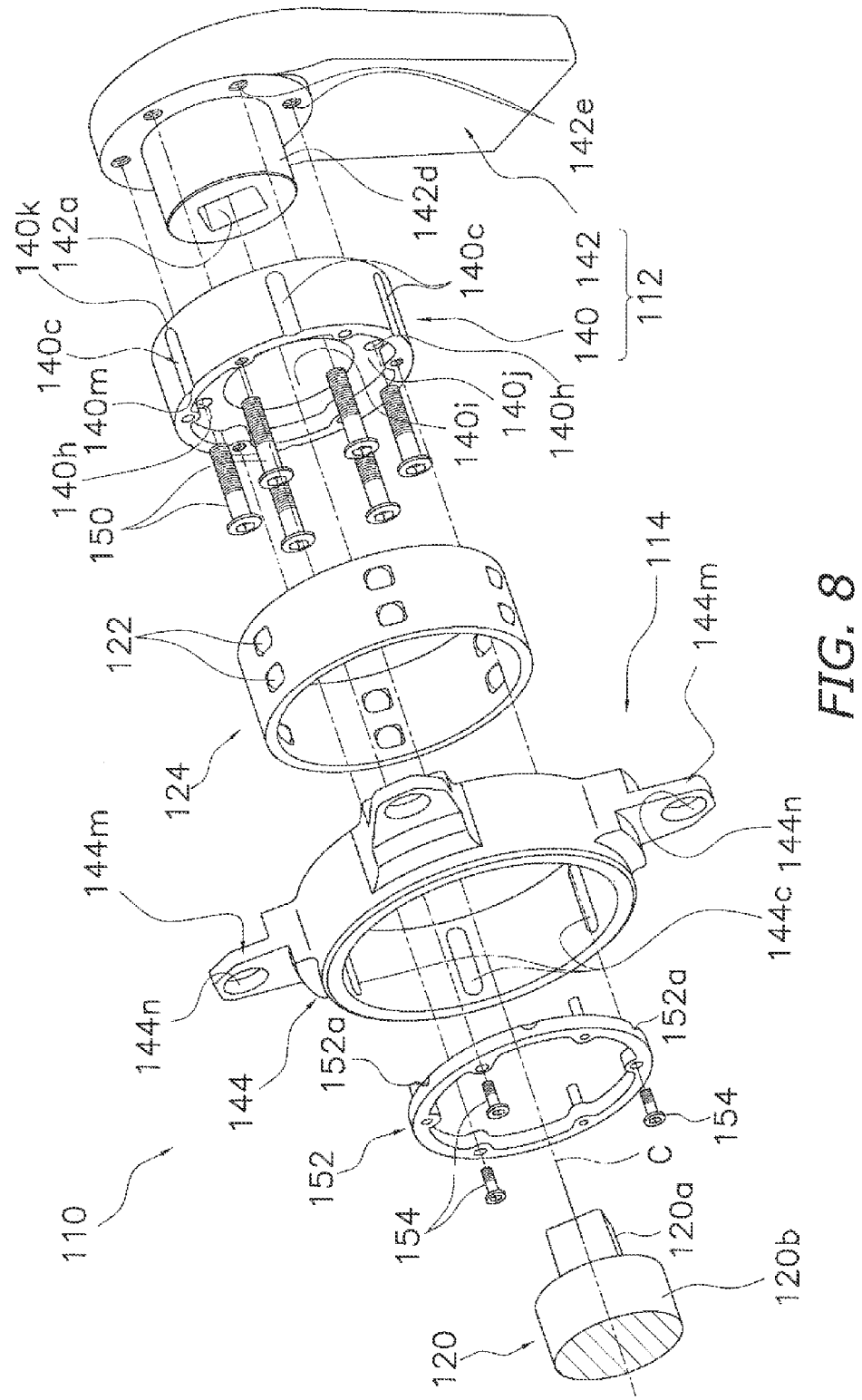
FIG. 8 is an exploded perspective view of the bicycle crank assembly illustrated in FIG. 7.

In FIGS. 7 and 8, a crank assembly 110 is illustrated in accordance with a second embodiment. In the following explanations of the second embodiment, regarding configurations that correspond to the configuration of the first embodiment, the reference symbols used in the first embodiment are shown with three-digit codes with the same last two digits, and the configurations that are the same as the configurations of the first embodiment will be shown with the same reference symbols.

As shown in FIGS. 7 and 8, the crank assembly 110 according to the second embodiment comprises a rotational center axis C. The crank assembly 110 comprises a crank member 112 and a sprocket member 114. The crank assembly 110 further comprises a crank axle 120, at least one rolling member 122 and a retaining member 124.

The crank member 112 comprises a generally tubular support portion 140, an arm portion 142 and an axle mounting hole 142a. The support portion 140 extends in the direction of the rotational center axis C. The arm portion 142 can integrally rotate around the rotational center axis C with the support portion 140. The axle mounting hole 142a is formed with the rotational center axis C as the center. In the second embodiment, the support portion 140 is installed separately from the arm portion 142.

The support portion 140 is, for example, an iron-based alloy, such as stainless steel, or an aluminum-based alloy. On the outer peripheral surface of the support portion 140 is disposed a plurality of (for example, six) first contacting grooves 140c that are in contact with a plurality of rolling members 122 in the circumferential direction at intervals. The first end portion 140k is closed on the side of the arm portion 142 with the first contacting groove 140c. In the direction of the rotational center axis C, the second end portion 140m of the first contacting groove 140c that is positioned on the opposite side of the arm portion 142 is open. The movement of the sliding portion 144 toward the arm portion 142 is prevented in the part where the first contacting groove 140c is closed.

The support portion 140 is fixed to the arm portion 142 by a plurality of (for example, six) fixing bolts 150. In the support portion 140 is formed a plurality of through-holes 140h through which the fixing bolt 150 passes, and a centering hole 140i in which the shaft mounting portion 142d of the arm portion 142 mentioned below is centered. The through-holes 140h are disposed on the outer peripheral side of the centering hole 140i at intervals in the circumferential direction. The centering hole 140i is disposed with the rotational center axis C as the center.

An annular member 152 is fixed by a plurality of (for example, three) bolt members 154 to the end portion on the opposite side of the arm portion 142 of the support portion 140 in the direction of the rotational center axis C for closing the second end portion 140m of the first contacting groove 140c. On the end surface on the crank axle 120 side of the support portion 140 is formed an annular recess 140j for mounting the annular member 152. On the outer peripheral surface of the annular member 152 is disposed a groove end portion 152a, which is recessed at intervals in the circumferential direction, for closing the end part of the first contacting groove 140c, in the same location as the first contacting groove 140c.

The arm portion 142 comprises a shaft mounting portion 142d that engages with the centering hole 140h, an axle mounting hole 142a, and a pedal mounting hole 142b that is the same as in the first embodiment (refer to FIG. 7). The shaft mounting portion 142d is formed to be smaller in diameter than the proximal end portion of the arm portion 142. In the periphery of the shaft mounting portion 142d is formed a plurality of screw holes 142e to which the fixing bolts 150 are screwed. The axle mounting hole 142a opens on the end surface of the shaft mounting portion 142d. Unlike in the first embodiment, the axle mounting hole 142a is configured by a tapered taper hole whose cross section is generally rectangular. The axle mounting hole 142a has the same shape as that disclosed in Japanese Industrial Standard JIS D9415, FIG. 2. The arm portion 142 is coupled to the crank axle 120 in order to be integrally rotatable by mounting bolts that screw into the screw holes that are formed on the end surface of the crank axle 120.

The sprocket member 114, as shown in FIG. 7, comprises a sliding portion 144 and a sprocket main body 146. The sliding portion 144 extends in the direction of the rotational center axis C to be integral and rotatable with the support portion 140 and is also displaceable in the direction of the rotational center axis C. The support portion 140 and the sliding portion 144 constitute the sliding mechanism 116.

The sliding portion 144 is a tubular member that is disposed radially outward from the support portion 140. In other words, the support portion 140 is disposed radially inside of the sliding portion 144. Meanwhile, the support portion can also be disposed radially outward from the sliding portion. On the inner peripheral surface of the sliding portion 144 is formed a second contacting groove 144c that can come into contact with the rolling member 122. Both ends of the second contacting groove 144c in the direction of the rotational center axis C are closed. A plurality of (for example, four) sprocket coupling arms 144m that extend radially is integrally installed on the outer peripheral surface of the sliding portion 144. The sprocket main body 146 is fixed to the sprocket coupling arm 144m. A through-hole 144n for fixing the sprocket is formed at the distal end portion of each sprocket coupling arm 144m. In this way, in the second embodiment, a reinforcing member is not installed, and the rolling member 122 is directly in contact with the support portion 140 and the sliding portion 144.

The sprocket main body 146 comprises sprocket teeth 146a on the outer peripheral part and is coupled with the sliding portion 144 in order to be integrally rotatable as well as detachable. The sprocket main body 146 is formed with a plurality of (for example, four) coupling protrusions 146b that engage with the sprocket coupling arm 144m in the inner peripheral part, extending on the inner peripheral side. To each coupling protrusion 146b is formed a coupling hole 146c that aligns with the through-hole 144n. A nut member 156 is inserted into this through-hole 144n and the coupling hole 146c; by screwing the bolt member 158 that is mounted from the opposite side of the sprocket main body 146 into the nut member 156, the sprocket main body 146 is fixed to the sliding portion 144.

The crank axle 120 comprises a tapered taper part 120a with a rectangular cross section that engages with the axle mounting hole 142a, as well as a large-diameter support portion 120b that is rotatably supported by a bottom bracket, which is not diagrammed. The taper part 120a has the same shape as that disclosed in JIS D 9403, FIG. 2. In the second embodiment, the crank axle 120 is detachably coupled with the axle mounting hole 142a.

In the second embodiment, at least one rolling member 122 is disposed between the support portion 140 and the sliding portion 144. In the present embodiment, there is a plurality of rolling members 122. Specifically, two rolling members 122 are disposed in a row in the direction of the rotational center axis C, and six are disposed in the circumferential direction at intervals. Therefore, twelve rolling members 122 are used in the present embodiment. In the present embodiment, the rolling member 122 is a sphere. The rolling member 122 can also be needle-shaped or roller-shaped.

The retaining member 124 is a member made of a cylindrical metal plate. The retaining member 124 can be configured by a non-metallic material, such as a rigid resin, etc. The retaining member 124 retains a plurality of rolling members 122 at intervals in the circumferential direction. In the present embodiment, the retaining member 124 also retains a plurality of (for example, two) rolling members 122 at intervals in the direction of the rotational center axis C. The retaining member 124 is disposed between the support portion 140 and the sliding portion 144. The retaining member 124 can move in the direction of the rotational center axis C in the range in which the rolling member 122 can contact with the first contacting groove 140c and second contacting groove 144c and move.

Even in the crank assembly 110 according to the second embodiment configured in this way, both the sliding portion 144 and the support portion 140 to which is mounted the sprocket main body 146 (that is, the sliding mechanism 116) are configured to extend in the direction of the rotational center axis C, and the support portion 140 and the sliding portion 144 can maintain a high strength.

Third Embodiment

Figure 9:
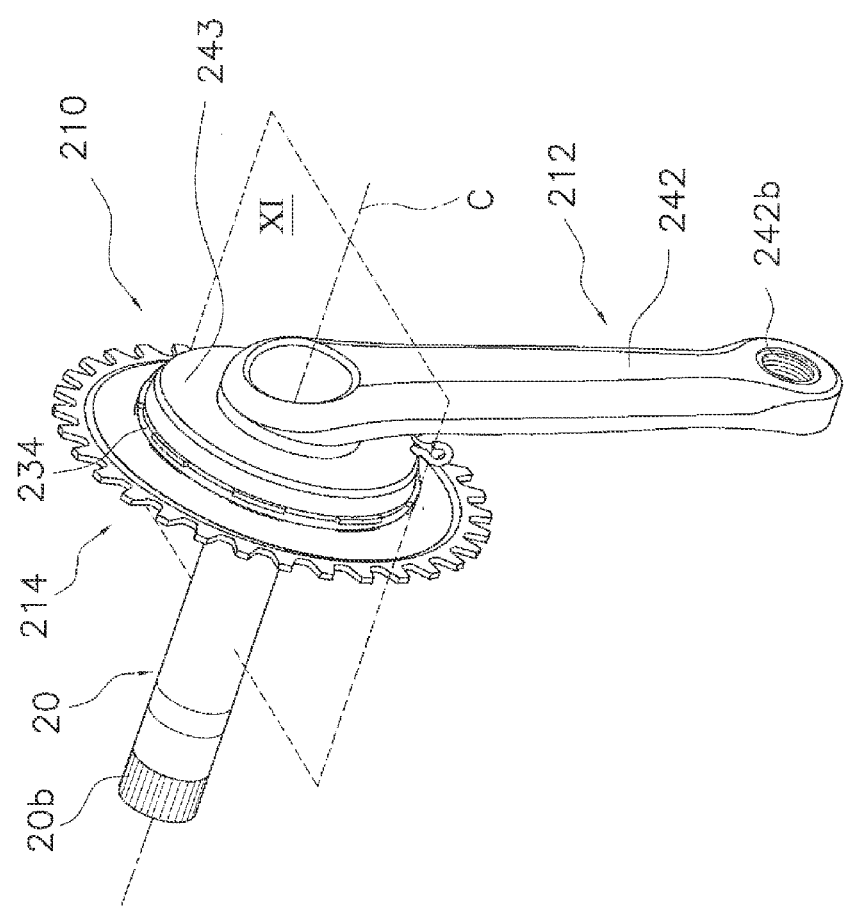
FIG. 9 is a front perspective view of the bicycle crank assembly according to a third embodiment of the present invention.
Figure 10:
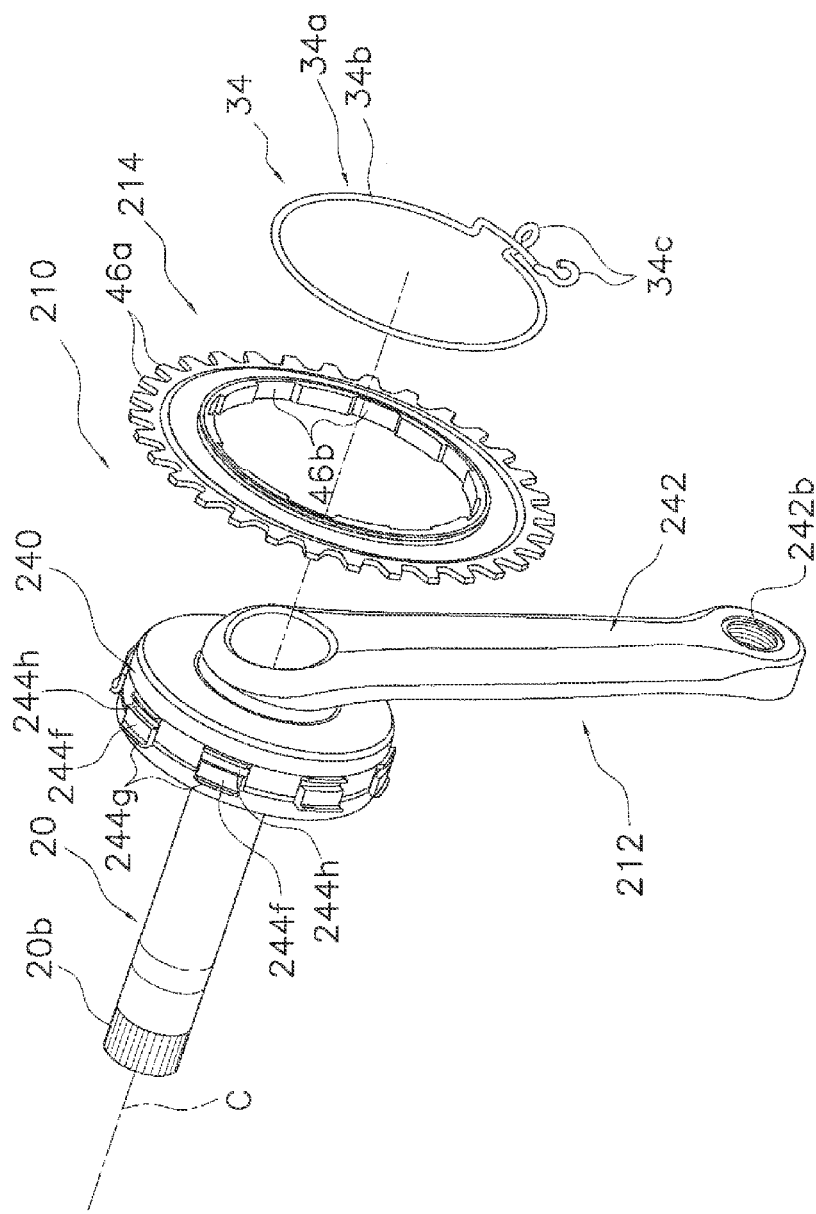
FIG. 10 is an exploded perspective view of the bicycle crank assembly illustrated in FIG. 9.
Figure 11:
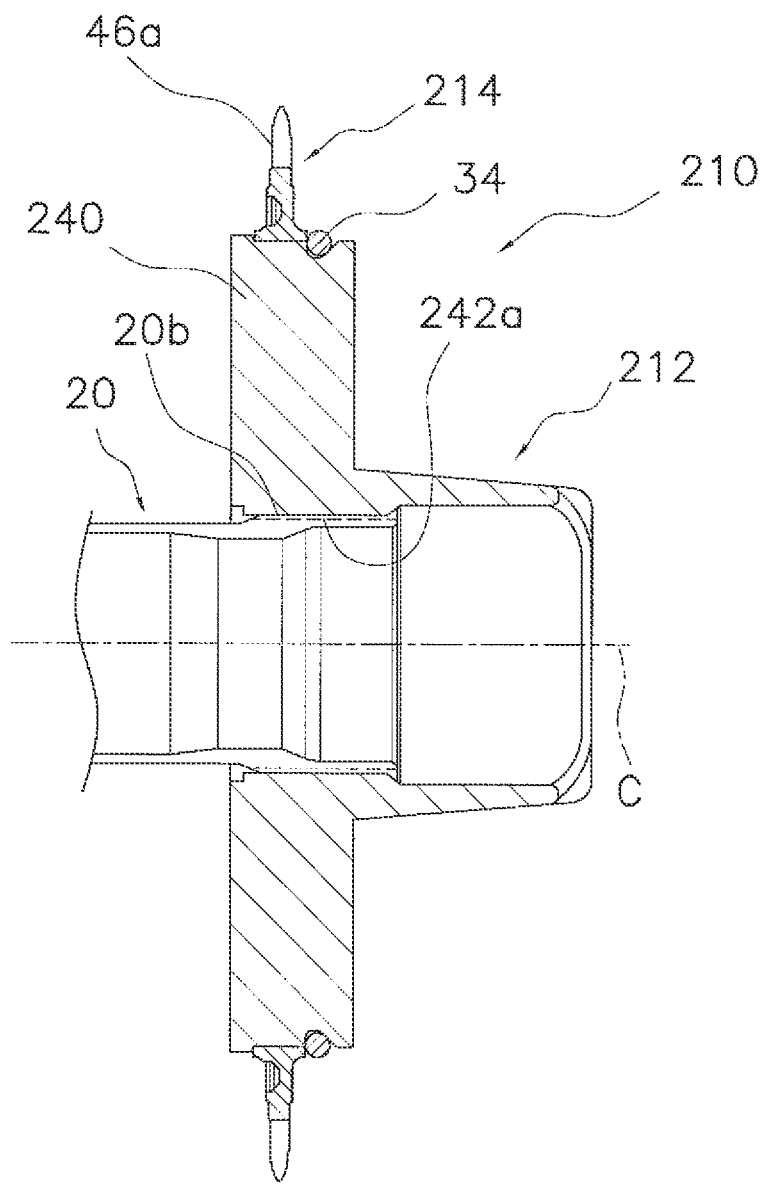
FIG. 11 is a cross-sectional view of the bicycle crank assembly taken along section plane XI of FIG. 9.

In FIGS. 9 to 11, a crank assembly 210 is illustrated in accordance with a third embodiment. The crank assembly 210 has a rotational center axis C. The crank assembly 210 comprises a crank member 212, a sprocket member 214, a crank axle 20, and a tool-free stopper member 34. Therefore, in the present embodiment, a sliding mechanism is not installed.

The crank member 212 is a member made of a light metal, for example, aluminum, etc., and is rotatable around the rotational center axis C. The crank member 212 comprises a sprocket coupling section 240 and an arm portion 242. The sprocket coupling section 240 is a disc-shaped member that can mount a sprocket member 214 around the rotational center axis C in order to be integrally rotatable as well as detachable. The sprocket coupling section 240 has a plurality of (for example, eight) coupling protrusions 244f for mounting the sprocket member 214 in order to be integrally rotatable as well as detachable on the outer peripheral surface. The coupling protrusion 244f is formed at regular intervals or irregular intervals in the circumferential direction. In this embodiment, the coupling protrusions 244f are formed at regular intervals, but they can also be at irregular intervals. Additionally, the sprocket coupling section 240 comprises a positioning protrusion 244g for positioning the sprocket member 214 on the outer peripheral surface in the direction of the rotational center axis C, as well as a mounting groove 244h for mounting the tool-free stopper member 34. The positioning protrusion 214g can be any shape that allow for the positioning of the mounting direction of the sprocket member 214. In the present embodiment, a plurality of positioning protrusions are disposed at intervals in the circumferential direction, but the positioning protrusions 244g can also be integrally formed in an annular shape. Furthermore, the mounting groove 244h extends in an arc-shape along the circumferential direction of the positioning protrusions 244g. When the tool-free stopper member 34 is mounted to the mounting groove 244h, the sprocket member 214 that is positioned by the positioning protrusion 244g is stopped in the direction of the rotational center axis C.

The arm portion 242 is integrally installed ON the support portion on the sprocket, coupling section 240. The arm portion 242 is configured in the same way as the arm portion. 42 of the first embodiment and comprises an axle mounting hole 242a and a pedal mounting hole 242b.

The sprocket member 214 is configured in the same way as the sprocket main body 46 of the first embodiment. The sprocket member 214 has a plurality of sprocket teeth 46a on the outer peripheral part. The sprocket member 214 has a plurality of coupling recesses 46b that engage with the coupling protrusions 244f on the inner peripheral part.

The crank axle 20 is configured in the same way as the first embodiment and is press fitted to the axle mounting hole 242a. The crank axle 20 comprises a first engaging section 20a and a second engaging section 20b.

The tool-free stopper member 34 is configured in the same way as in the first embodiment and can stop the sprocket member 214 in the axial direction with respect to the crank member 212. The sprocket member 214 can be detached manually without using a tool. The tool-free stopper member 34 includes a retaining ring 34a. The retaining ring 34a, in the same way as in the first embodiment, comprises an annular spring section 34b and a pair of operating handles 34c that are installed on both ends of the annular spring section 34b.

In the bicycle crank assembly 210 according to the third embodiment configured in this way, since the tool-free stopper member 34 can be attached and detached when attaching and detaching the sprocket member 214 without using a tool, the sprocket member 214 can be easily attached and detached.

Fourth Embodiment

Figure 12:
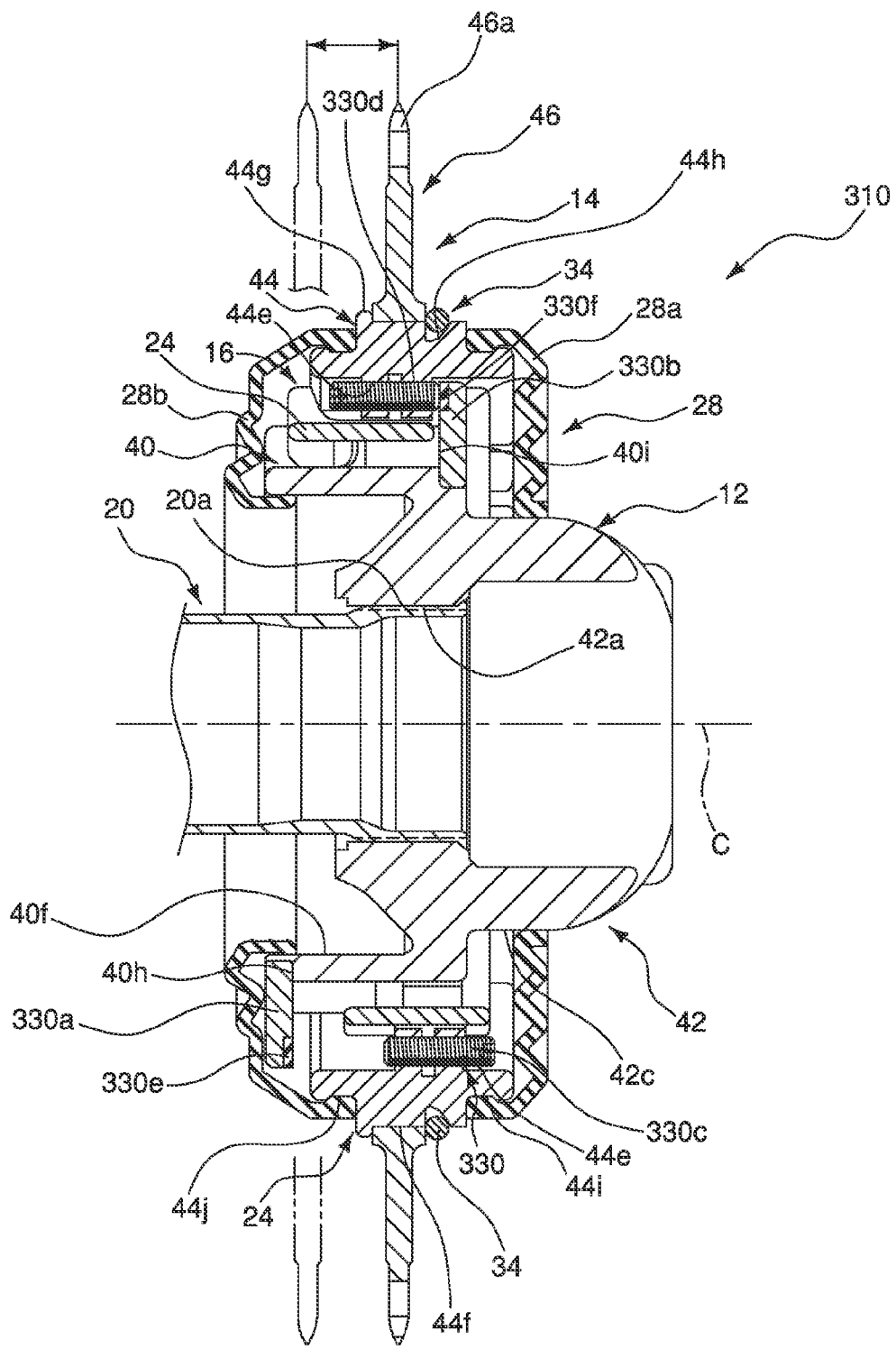
FIG. 12 is a cross-sectional view, similar to FIG. 5, of a bicycle crank assembly in accordance with a fourth embodiment.
Figure 13:
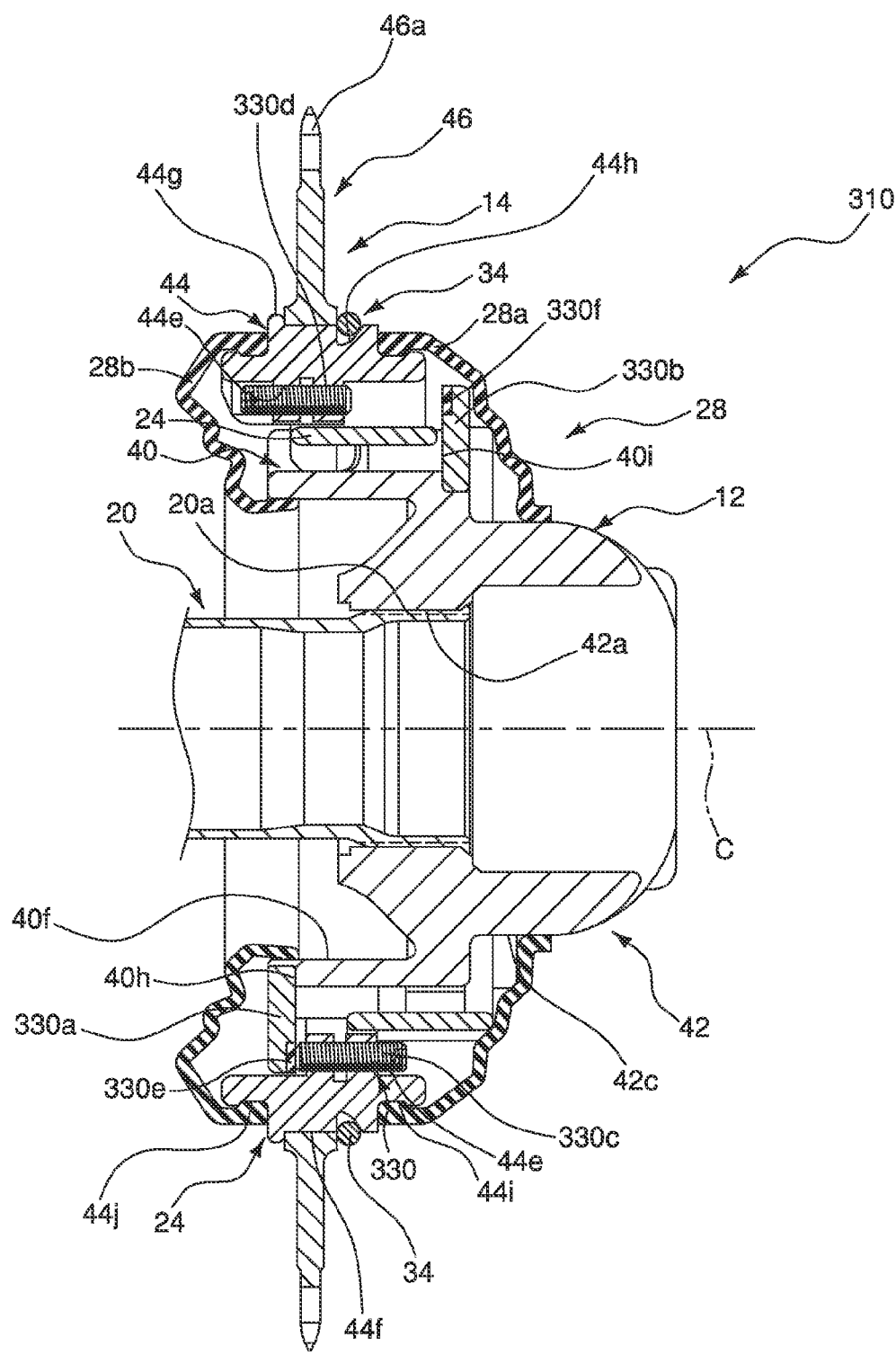
FIG. 13 is a cross-sectional view of the bicycle crank assembly illustrated in FIG. 12 but with the sprocket member and the sliding portion shifted to the left from the position illustrated in FIG. 12.

As shown in FIGS. 12 and 13, a crank assembly 310 is illustrated in accordance with a fourth embodiment. The crank assembly 310 is identical to the crank assembly 10, except that an impact absorbing feature has been added as explained below. In the following explanations, regarding configurations that correspond to the configuration of the first embodiment, the reference symbols used in the first embodiment are shown with three-digit codes with the same last two digits, and the configurations that are the same as the configurations of the first embodiment will be shown with the same reference symbols.

As shown in FIGS. 12 and 13, the crank assembly 310 includes the crank member 12, the sprocket member 14, the crank axle 20, the retaining member 24, a dust cover 28 and a tool-free stopper member 34 of the first embodiment. The bicycle crank assembly 310 has a rotational center axis C. Although not shown in FIGS. 12 and 13, the crank assembly 310 also includes the rolling members 22, the reinforcing members 26 and the backlash removing mechanism 32 of the first embodiment. The crank member 12 includes the support portion 40 that has the axle mounting hole 42a with the rotational center axis C as the center. The crank member 12 is rotatably arranged around the rotational center axis C. Similar to the first embodiment, in the bicycle crank assembly 310, the sprocket member 14 is integrally and rotatably attached to the crank member 12. Also similar to the first embodiment, the bicycle crank assembly 310 further comprises the sliding mechanism 16 for movably coupling the sprocket member 14 in an axial direction with respect to the crank member 12.

The crank assembly 310 further includes a movement amount adjusting mechanism 330 that includes a first stopper (regulating) member 330a, another first stopper (regulating) member 330b, a second stopper (adjusting) member 330c and another second stopper (adjusting) member 330d. The first stopper members 330a, 330b are attached to the crank member 12 in the same manner as in the first embodiment as discussed above. The first stopper members 330a, 330b constitute first and second regulating members. The second stopper members 330c, 330d is attached to the sprocket member 14 in the same manner as in the first embodiment as discussed above. The second stopper members 330c, 330d constitute first and second adjusting members. The fourth embodiment differs from the first embodiment in that the movement amount adjusting mechanism 330 of the crank assembly 310 further comprises a damping member 330e. The damping member 330e is attached to at least one of the first stopper members 330a, 330b and the second stopper members 330c, 330d, and configured to contact the other of the first stopper members 330a, 330b and the second stopper members 330c, 330d while the sliding mechanism 16 is in operation. The damping member 330e is preferably attached to the at least one of the first stopper members 330a, 330b and the second stopper members 330c, 330d by adhesive. Preferably, the movement amount adjusting mechanism 330 further comprises another damping member 330f. Here, in the fourth embodiment, the damping members 330e, 330f are fixed to the first stopper members 330a, 330b, respectively. Also here, in the fourth embodiment, the damping members 300e, 300f are preferably attached to the first stopper members 330a, 330b by adhesive. The damping members 330e, 330f are preferably made of an elastic material. The damping members 330e, 330f are more preferably made of urethane.

The first stopper members 330a, 330b and the second stopper members 330c, 330d constitute the movement amount adjusting mechanism 330 for selectively adjusting an amount of movement of the sliding mechanism 16.

Fifth Embodiment

Figure 14:
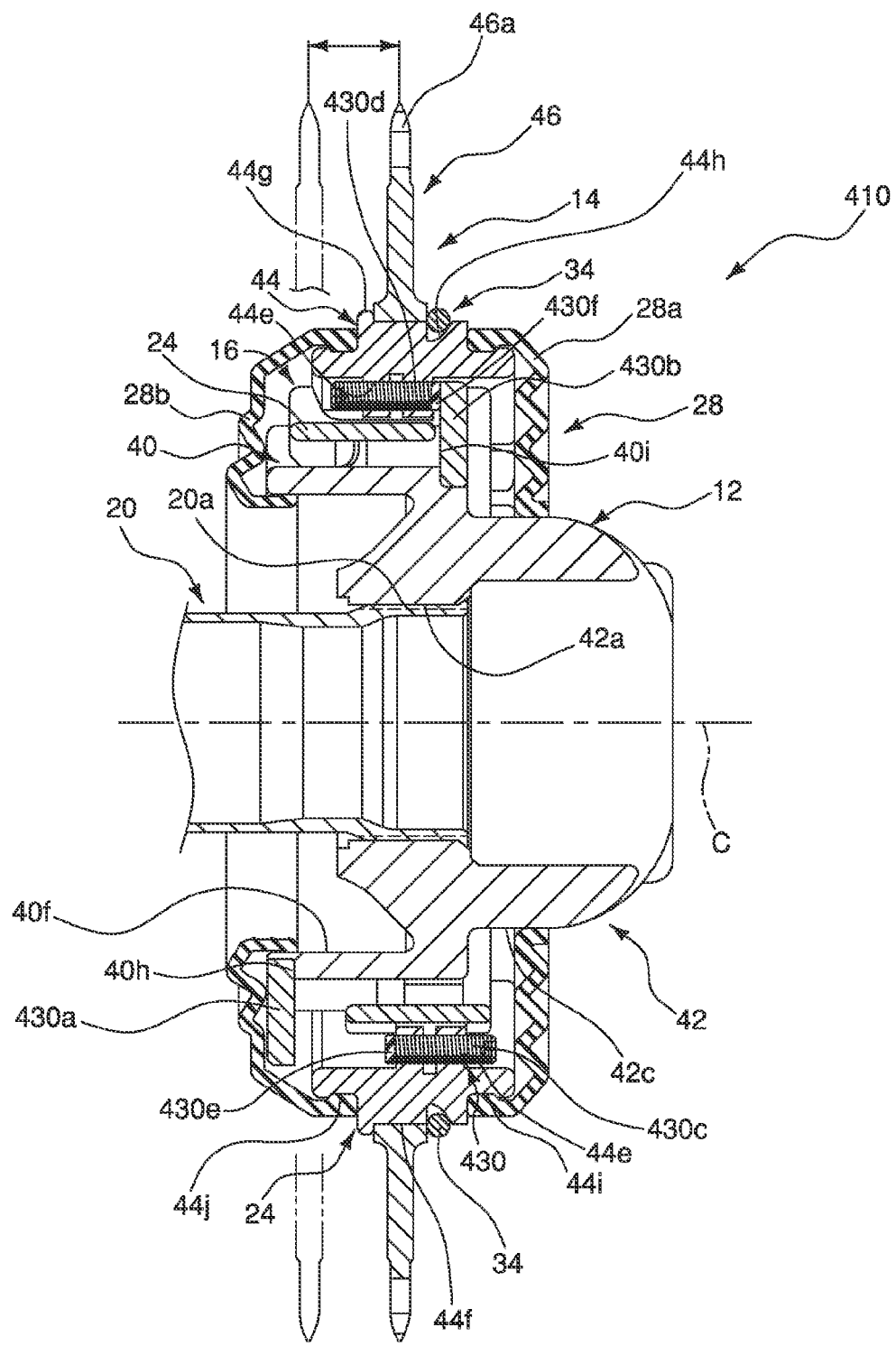
FIG. 14 is a cross-sectional view, similar to FIG. 5, of a bicycle crank assembly in accordance with a fifth embodiment.
Figure 15:
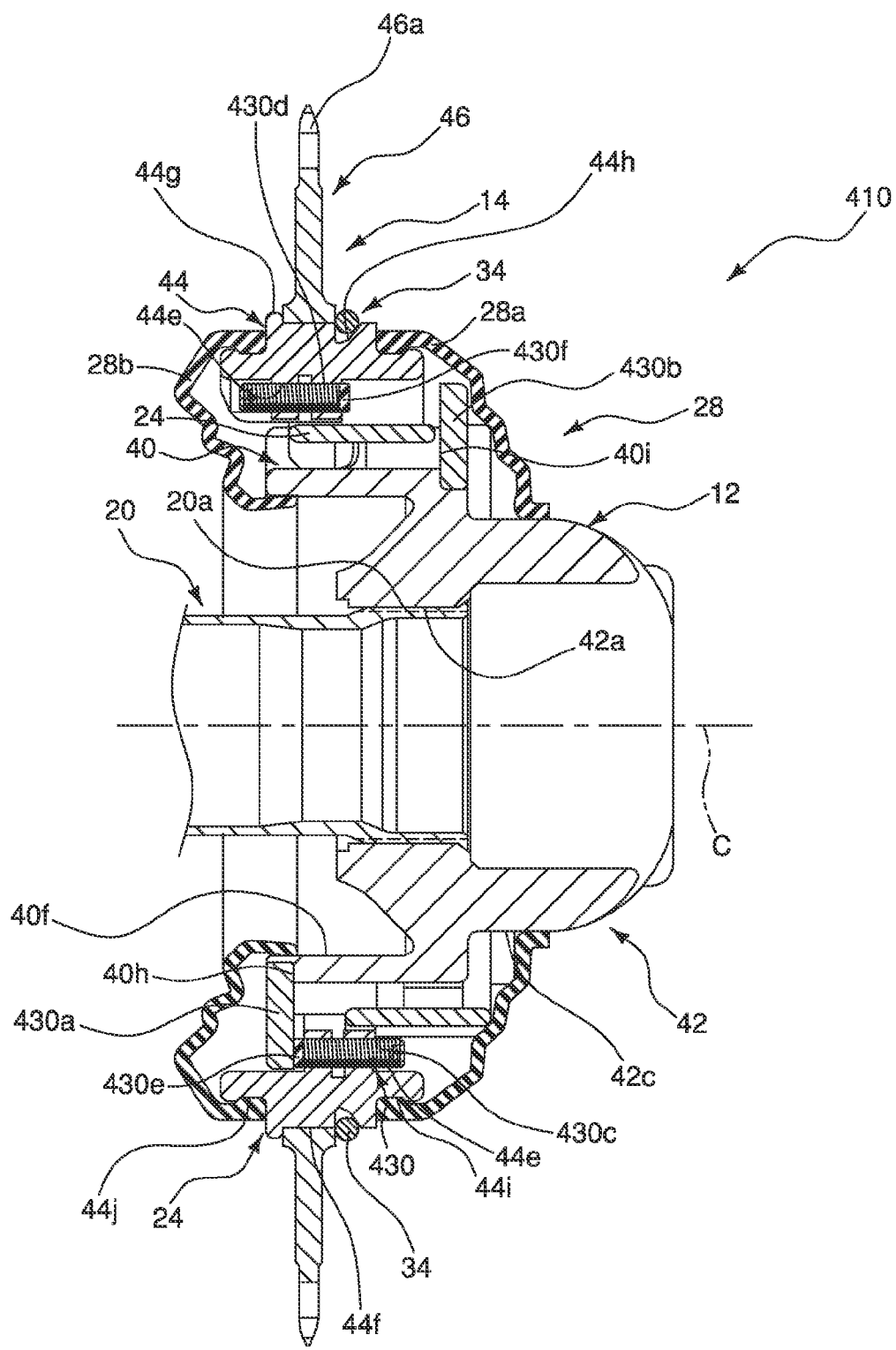
FIG. 15 is a cross-sectional view of the bicycle crank assembly illustrated in FIG. 14 but with the sprocket member and the sliding portion shifted to the left from the position illustrated in FIG. 14.

As shown in FIGS. 14 and 15, a crank assembly 410 is illustrated in accordance with a fifth embodiment. The crank assembly 410 is identical to the crank assembly 10, except that an impact absorbing feature has been added as explained below. In the following explanations, regarding configurations that correspond to the configuration of the first embodiment, the reference symbols used in the first embodiment are shown with three-digit codes with the same last two digits, and the configurations that are the same as the configurations of the first embodiment will be shown with the same reference symbols.

As shown in FIGS. 14 and 15, the crank assembly 410 includes the crank member 12, the sprocket member 14, the crank axle 20, the retaining member 24, a dust cover 28 and a tool-free stopper member 34 of the first embodiment. The bicycle crank assembly 410 has a rotational center axis C. Although not shown in FIGS. 14 and 15, the crank assembly 410 also includes the rolling members 22, the reinforcing members 26 and the backlash removing mechanism 32 of the first embodiment. The crank member 12 includes the support portion 40 that has the axle mounting hole 42a with the rotational center axis C as the center. The crank member 12 is rotatably arranged around the rotational center axis C. Similar to the first embodiment, in the bicycle crank assembly 410, the sprocket member 14 is integrally and rotatably attached to the crank member 12. Also similar to the first embodiment, the bicycle crank assembly 410 further comprises the sliding mechanism 16 for movably coupling the sprocket member 14 in an axial direction with respect to the crank member 12.

The crank assembly 410 further includes a movement amount adjusting mechanism 430 that includes a first stopper (regulating) member 430a, another first stopper (regulating) member 430b, a second stopper (adjusting) member 430c and another second stopper (adjusting) member 430d. The first stopper members 430a, 430b are attached to the crank member 12 in the same manner as in the first embodiment as discussed above. The first stopper members 430a, 430b constitute first and second regulating members. The second stopper members 430c, 430d are attached to the sprocket member 14 in the same manner as in the first embodiment as discussed above. The second stopper member 430c, 430d constitute first and second adjusting members. The fifth embodiment differs from the first embodiment in that the movement amount adjusting mechanism 430 of the crank assembly 410 further comprises a pair of damping members 430e, 430f. Here, in the fifth embodiment, the damping members 430e, 430f are attached to the second stopper members 430c, 430d, respectively, and configured to contact the first stopper members 430a, 430b, respectively, while the sliding mechanism 16 is in operation. The damping members 430e, 430f are preferably attached to the second stopper members 430c, 430d by adhesive, respectively. The damping members 430e, 430f are preferably made of an elastic material. The damping members 430e, 430f are more preferably made of urethane (preferably, with a low resilience).

Sixth Embodiment

Figure 16:
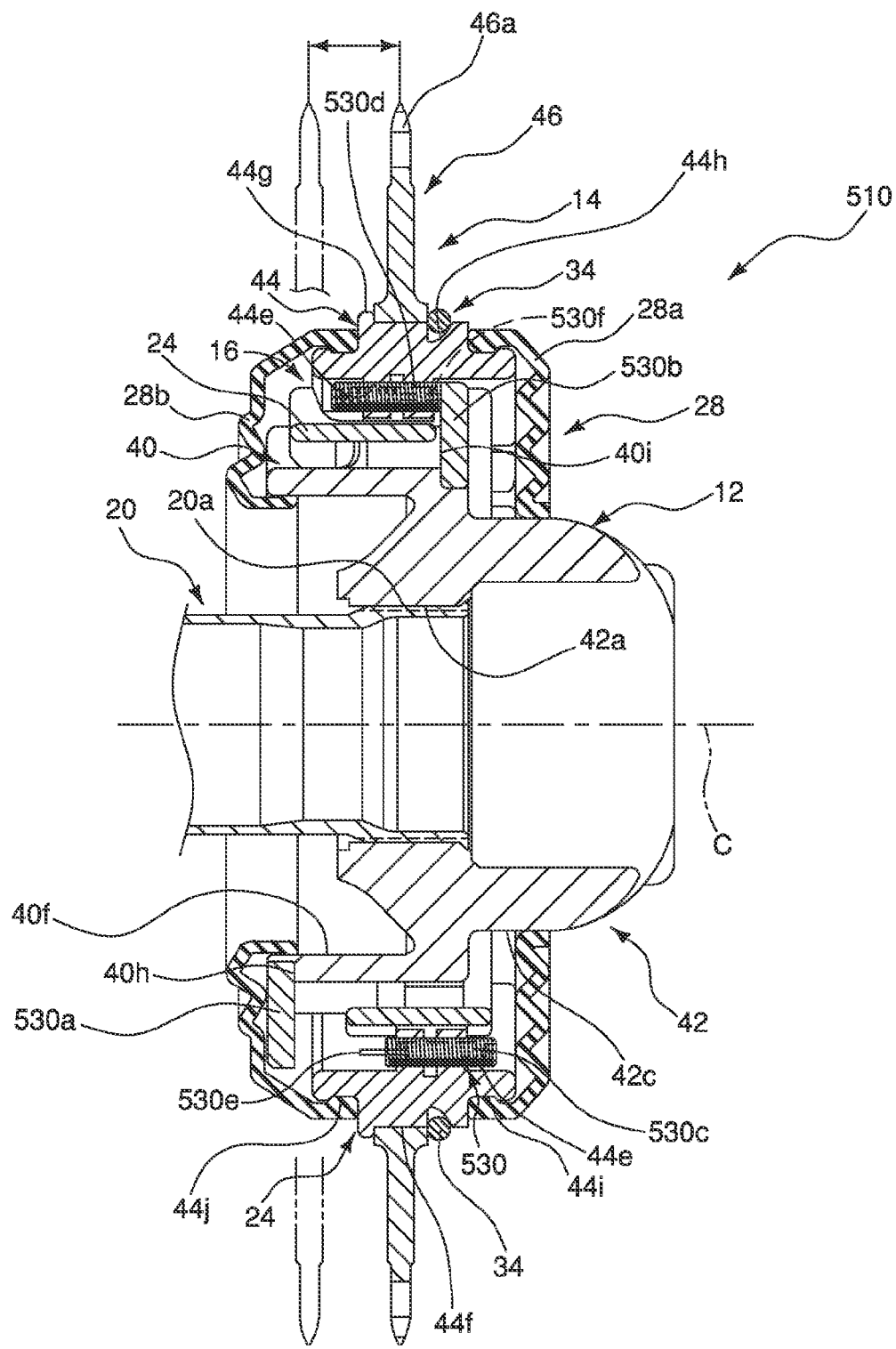
FIG. 16 is a cross-sectional view, similar to FIG. 5, of a bicycle crank assembly in accordance with a sixth embodiment.
Figure 17:
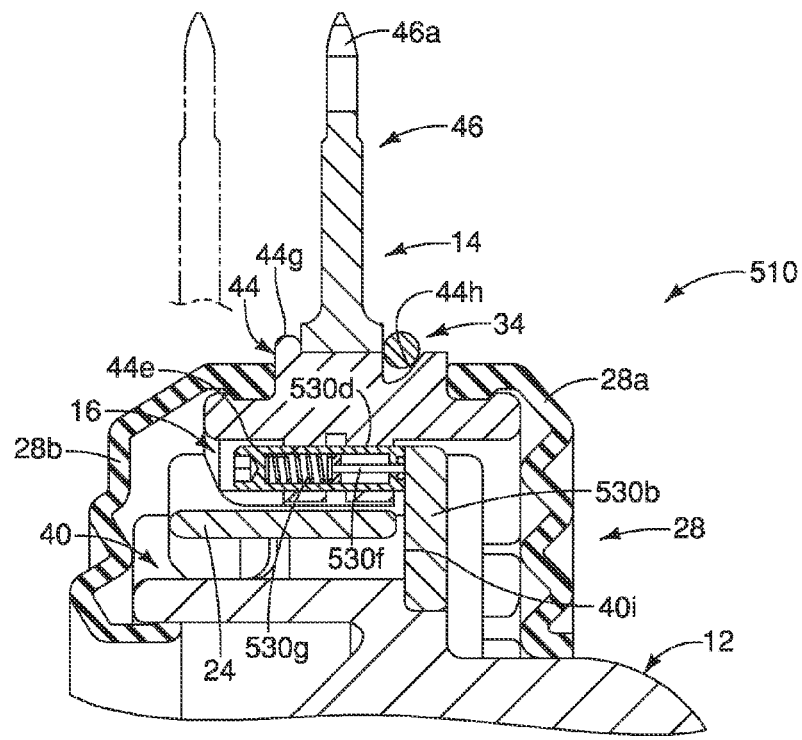
FIG. 17 is a partial cross-sectional view of a portion of the bicycle crank assembly illustrated in FIG. 16.
Figure 18:
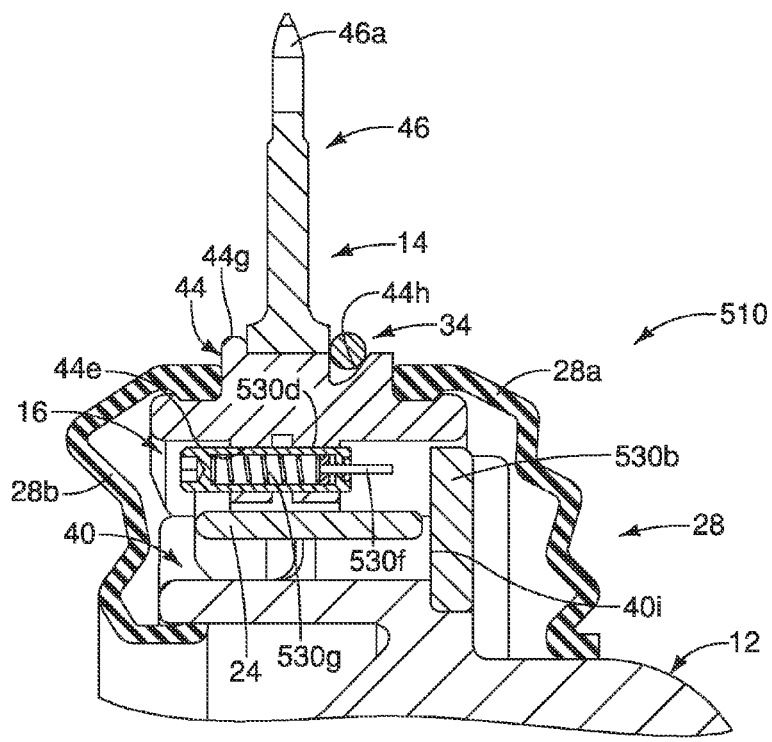
FIG. 18 is a partial cross-sectional view of the portion of the bicycle crank assembly illustrated in FIG. 17, but with the sprocket shifted to the left from the position illustrated in FIG. 17 to a floating position.

As shown in FIGS. 16 to 18, a crank assembly 510 is illustrated in accordance with a sixth embodiment. The crank assembly 510 is identical to the crank assembly 10, except that an impact absorbing feature has been added as explained below. In the following explanations, regarding configurations that correspond to the configuration of the first embodiment, the reference symbols used in the first embodiment are shown with three-digit codes with the same last two digits, and the configurations that are the same as the configurations of the first embodiment will be shown with the same reference symbols.

As shown in FIGS. 16 to 18, the crank assembly 510 includes the crank member 12, the sprocket member 14, the crank axle 20, the retaining member 24, a dust cover 28 and a tool-free stopper member 34 of the first embodiment. The bicycle crank assembly 510 has a rotational center axis C. Although not shown in FIGS. 16 to 18, the crank assembly 510 also includes the rolling members 22, the reinforcing members 26 and the backlash removing mechanism 32 of the first embodiment. The crank member 12 includes the support portion 40 that has the axle mounting hole 42a with the rotational center axis C as the center. The crank member 12 is rotatably arranged around the rotational center axis C. Similar to the first embodiment, the bicycle crank assembly 510, the sprocket member 14 is integrally and rotatably attached to the crank member 12. Also similar to the first embodiment, the bicycle crank assembly 510 further comprises the sliding mechanism 16 for movably coupling the sprocket member 14 in an axial direction with respect to the crank member 12.

The crank assembly 510 further includes a movement amount adjusting mechanism 530 that includes a first stopper (regulating) member 530a, another first stopper (regulating) member 530b, a second stopper (adjusting) member 530c and another second stopper (adjusting) member 530d. The first stopper members 530a, 530b are attached to the crank member 12 in the same manner as in the first embodiment as discussed above. The first stopper members 530a, 530b constitute first and second regulating members. The second stopper members 530c, 530d are attached to the sprocket member 14 in the same manner as in the first embodiment as discussed above. The second stopper members 530c, 530d constitute first and second adjusting members. The sixth embodiment differs from the first embodiment in that the movement amount adjusting mechanism 530 of the crank assembly 510 further comprises a pair of damping members 530e, 530f. Here, in the sixth embodiment, the damping members 530e, 530f are slidably coupled to the second stopper members 530c, 530d, respectively, and configured to contact the first stopper members 530a, 530b, respectively, while the sliding mechanism 16 is in operation. Here, the damping members 530e, 530f include a rod as the contact member for selectively contacting the first stopper members 530a, 530b. The damping members 530e, 530f are biased to an extended position by a biasing member 530g (e.g., a coil compression spring in the sixth embodiment). Thus, the first stopper members 530a, 530b together with the damping members 530e. 530f and the biasing members 530g (only one shown) constitutes rod plungers, which are identical in construction. While the first stopper members 530a, 530b are each provided with an external thread for adjustably attaching the first stopper members 530a, 530b to the sliding portion 44 of the sprocket member 14, the first stopper members 530a, 530b can be adjustably attached in other ways as needed and/or desired. Also, while the first stopper members 530a, 530b are illustrated as a single piece, preferably, the first stopper members 530a, 530b are constructed of two or more pieces for installing the damping members 530e, 530f and the biasing members 530g inside the first stopper members 530a, 530b.

Modified Examples

Embodiments of the present invention were described above; however, the present invention is not limited to the above-described embodiments, and various modifications can be made without departing from the scope of the invention. Specifically, the various embodiments and modified examples described in the present disclosure can be freely combined according to necessity.

(a) In each of the first, fourth, fifth and sixth embodiments, the reinforcing members 26, the dust cover 28, the movement amount adjusting mechanism 30, the backlash removing mechanism 32, and the tool-free stopper member 34 were installed. However, these parts do not have to be installed, or at least one of these parts can be installed.

(b) In the second embodiment, a plurality of reinforcing members, a dust cover, a movement amount adjusting mechanism, a backlash removing mechanism, and a tool-free stopper member are not installed. However, the second embodiment is not limited to this configuration. The second embodiment can have at least one of a plurality of reinforcing members, a dust cover, a movement amount adjusting mechanism, a backlash removing mechanism and a tool-free stopper member installed. Specifically, when installing a tool-free stopper member, the configuration of the outer peripheral surface of the sliding portion 144 should be configured in the same way as in the first embodiment. Besides the above, the plurality of reinforcing members, the dust cover, the movement amount adjusting mechanism, and the backlash removing mechanism can also be applied in the configuration of the second embodiment.

(c) In each of the first, second, fourth, fifth and sixth embodiments, the sliding resistance was reduced using a rolling member between the support portion and the sliding portion. However, the embodiments are not limited to this configuration. The support portion and the sliding portion can be directly coupled so that they are slidable as well as integrally rotatable. For example, the support portion and the sliding portion can be spline engaged. In this case, for example, lubricating oil or a coating for reducing the sliding resistance, such as a fluorine compound coating or a hard carbon film, etc., can be formed on at least one of the sliding surface of the support portion and the sliding surface of the sliding portion.

(d) In each of the first, third, fourth, fifth and sixth embodiments, the tool-free stopper member 34 was configured by a spring wire material. However, the embodiments are not limited to this configuration. The tool-free stopper member can be configured in any way as long as the sprocket main body 46 and the sprocket member 214 can be manually detached. For example, the tool-free stopper member can be a screw member or an elastic locking member that can be directly attached and detached with respect to the sliding portion using one's fingers.

(e) In the above-described embodiments, there was only one front sprocket. However, the embodiments are not limited to this configuration. The present invention can be applied to a crank assembly with a plurality of (for example, two or three) front sprockets. Specifically, in this case, the degree to which the chain is disposed at an angle that is caused by the engagement of the minimum number of teeth meshing with each other or the maximum number of teeth meshing with each other between the front sprocket and the rear sprocket can be reduced.

(f) In the above-described embodiments, the thickness of each sprocket tooth in the direction of the rotational center axis C (the axial direction) was the same, but the present invention is not limited to this. For example, the total number of sprocket teeth can be made an even number, and first sprocket teeth comprising a first axial thickness that engages with the outer link of the chain but that does not engage with the inner link of the chain, as well as second sprocket teeth comprising a second axial thickness that is smaller than the first axial thickness and that can engage with the inner link of the chain, can be alternately disposed in the circumferential direction. In this kind of configuration, the chain does not easily come off of the sprocket during rotational driving.

(g) The circumferential direction length of the distal end of the sprocket teeth in the radial direction can be made to be larger than the circumferential direction length of the intermediate part of the sprocket teeth in the radial direction where the roller of the chain contacts during rotational driving. In this kind of configuration, the chain does not easily come off of the sprocket during rotational driving.

(h) In the fourth and fifth embodiments, the damping members are made of an elastic material such as urethane. However, the damping members are not limited to this configuration. For example, alternatively, the damping members can be springs.

(i) in the sixth embodiment, the damping members are rod shaped members that form rod plungers with the first stopper members. However, the damping members are not limited to this configuration. The damping members can be a ball plunger having a ball as a contact member. The ball can be made of either an elastic material or a non-elastic material.

According to the present invention, the support portion and the sliding portion slide between the support portion and the sliding portion that extend in the axial direction, so that the strength of the part that supports the sprocket member can be maintained at a high level.

According to another aspect of the present invention, since the tool-free stopper member can be attached and detached when attaching and detaching the sprocket member without using a tool, the sprocket member can be easily attached and detached.

The term "comprising" and its derivatives, as used herein, are intended to be open ended terms that specify the presence of the stated features, elements, components, groups, integers, and/or steps. This concept also applies to words of similar meaning, for example, the terms "have", "include" and their derivatives.

The term "attached" or "attaching", as used herein, encompasses configurations in which an element directly attached to another element by directly affixing the element to the other element; configurations in which the element is indirectly attached to the other element via intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A bicycle crank assembly having a rotational center axis, the bicycle crank assembly comprising:
   a crank member having an axle mounting hole having a center that is aligned with the rotational center axis, the crank member further having a support portion and an arm portion, the support portion extending from the arm portion in an axial direction with respect to the rotational center axis and being formed around the axle mounting hole, the arm portion being integrally rotatable around the rotational center axis with the support portion; and
   a sprocket member having an annular sliding portion that extends around the rotational center axis and extending in the axial direction, the sliding portion being integrally rotatable with the support portion, the sliding portion being displaceably coupled to the support portion in the axial direction.

2. The bicycle crank assembly as recited in claim 1, wherein
   the support portion is disposed radially inward of the sliding portion.

3. The bicycle crank assembly as recited in claim 1, further comprising
   at least one rolling member that is disposed between the support portion and the sliding portion.

4. The bicycle crank assembly as recited in claim 1, further comprising
   a plurality of rolling members disposed between the support portion and the sliding portion, and a retaining member that retains the plurality of rolling members at intervals in a circumferential direction with respect to the rotational center axis.

5. The bicycle crank assembly as recited in claim 3, wherein
the rolling member is a sphere.

6. The bicycle crank assembly as recited in claim 4, further comprising
a reinforcing member that is installed in at least one of the support portion and the sliding portion and that slides so as to contact with the rolling member.

7. The bicycle crank assembly as recited in claim 6, wherein
the reinforcing member has a hardness that is greater than a hardness of the at least one of the support portion and the sliding portion, in which the reinforcing member is disposed.

8. The bicycle crank assembly as recited in claim 1, wherein
the crank member further comprises
a crank axle coupled to the axle mounting hole to be integrally rotatable with the crank member.

9. The bicycle crank assembly as recited in claim 8, wherein
the crank axle is coupled to the axle mounting hole by press fitting.

10. The bicycle crank assembly as recited in claim 8, wherein
the crank axle is coupled to the axle mounting hole by adhesive.

11. The bicycle crank assembly as recited in claim 8, wherein
the crank axle is detachably coupled to the axle mounting hole.

12. The bicycle crank assembly as recited in claim 1, wherein
the support portion is integrally installed with the arm portion.

13. The bicycle crank assembly as recited in claim 1, wherein
the support portion is separately installed from the arm portion.

14. The bicycle crank assembly as recited in claim 1, further comprising
a dust cover covering a gap between the support portion and the sliding portion.

15. The bicycle crank assembly as recited in claim 1, further comprising
a movement amount adjusting mechanism arranged to adjust a movement amount of the sliding portion in the axial direction with respect to the support portion.

16. The bicycle crank assembly as recited in claim 1, further comprising
a backlash removing mechanism arranged to remove backlash between the support portion and the sliding portion in a radial direction with respect to the rotational center axis.

17. The bicycle crank assembly as recited in claim 1, wherein
the sprocket member further includes a sprocket main body that is coupled to the sliding portion to be integrally rotatable therewith as well as detachably coupled to the sliding portion.

18. The bicycle crank assembly as recited in claim 17, further comprising
a tool-free stopper member fixing the sprocket main body with respect to the sliding portion in the axial direction and with which the sprocket main body is manually detachably coupled to the sliding portion.

19. A bicycle crank assembly having a rotational center axis, the bicycle crank assembly comprising:
a crank member having a support portion and an arm portion, the support portion extending from the arm portion in an axial direction, the arm portion being integrally rotatable around the rotational center axis with the support portion;
a sprocket member having a sliding portion that extends in the axial direction, the sliding portion being integrally rotatable with the support portion, the sliding portion being displaceably coupled to the support portion in the axial direction, the sprocket member further including a sprocket main body that is coupled to the sliding portion to be integrally rotatable therewith as well as detachably coupled to the sliding portion, the sliding portion further having an outer peripheral surface with a mounting groove that extends in a circumferential direction on the outer peripheral surface, and
a tool-free stopper member stopping the sprocket main body with respect to the sliding portion in the axial direction and with which the sprocket main body is manually detachably coupled to the sliding portion, the tool-free stopper member including:
an annular spring section that is mounted to the mounting groove and that has a smaller diameter than a mounting diameter of the mounting groove in an unbiased state, and
a pair of operating handles each extending radially outward from an end of the annular spring section for manually expanding a diameter of the annular spring section to be wider than the mounting groove.

20. A bicycle crank assembly having a rotational center axis, the bicycle crank assembly comprising:
a crank member having a support portion and an arm portion, the support portion extending from the arm portion in an axial direction with respect to the rotational center axis, the arm portion being integrally rotatable around the rotational center axis with the support portion;
a sprocket member having a sliding portion that extends in the axial direction and being integrally rotatable with support portion around the rotational center axis, the sliding portion further being displaceable coupled to the support portion in the axial direction;
and
a movement amount adjusting mechanism selectively adjusting an amount of movement of the sprocket member with respect to the crank member in the axial direction, the movement amount adjusting member including a screw that screws into a screw hole formed in one of the sliding portion and the support portion, the adjusting member further having a protrusion protruding from the screw hole to abut the other of the sliding portion and the support portion.

21. The bicycle crank assembly as recited in claim 20, wherein
the crank member has an axle mounting hole having a center that is aligned with the rotational center axis, and further comprising
a crank axle coupled to the axle mounting hole to be integrally rotatable with the crank member.

22. The bicycle crank assembly as recited in claim 21, wherein
the crank axle is coupled to the axle mounting hole by press fitting.

23. The bicycle crank assembly as recited in claim 21, wherein
the crank axle is coupled to the axle mounting hole by adhesive.

24. The bicycle crank assembly as recited in claim 21, wherein
the crank axle is detachably coupled to the axle mounting hole.

25. The bicycle crank assembly as recited in claim 20, wherein
a part of the sliding mechanism is integrally installed with the crank member.

26. The bicycle crank assembly as recited in claim 20, wherein
the sliding mechanism is separately installed from the crank member.

27. The bicycle crank assembly as recited in claim 20 further comprising
a dust cover covering a first end and a second end of the sliding mechanism that are opposite ends in the axial direction.

28. The bicycle crank assembly as recited in claim 20, further comprising
a backlash removing mechanism arranged to remove backlash of the sliding mechanism in a radial direction with respect to the rotational center axis.

29. The bicycle crank assembly as recited in claim 20, wherein
the sprocket member is detachably coupled to the sliding mechanism, and further comprising
a tool-free stopper member fixing the sprocket member with respect to the sliding mechanism in an axial direction and with which the sprocket member is manually detachably coupled to the sliding mechanism.

30. A bicycle crank assembly having a rotational center axis, the bicycle crank assembly comprising:
a crank member rotatably arranged around the rotational center axis;
a sprocket member integrally and rotatably attached to the crank member;
a sliding mechanism movably coupling the sprocket member in an axial direction with respect to the crank member, the sprocket member being detachably coupled to the sliding mechanism and further comprising a tool-free stopper member fixing the sprocket member with respect to the sliding mechanism in an axial direction and with which the sprocket member is manually detachably coupled to the sliding mechanism, the sliding mechanism having an outer peripheral surface with a mounting groove that extends in a circumferential direction on the outer peripheral surface, and the tool-free stopper member including
an annular sprang section that is mounted to the mounting groove and that has a smaller diameter than a mounting diameter of the mounting groove in a free state, and
a pair of operating handles each extending radially outward from an end of the annular spring section for manually expanding a diameter of the annular spring section to be wider than the mounting groove; and
a movement amount adjusting mechanism selectively adjusting an amount of movement of the sliding mechanism.

31. A bicycle crank assembly having a rotational center axis, the bicycle crank assembly comprising:
a crank member having a support portion and an arm portion, the support portion extending from the arm portion in an axial direction with respect to the rotational center axis, the arm portion being integrally rotatable around the rotational center axis with respect to the support portion;
a sprocket member having a sliding portion extending in the axial direction, the sliding portion being integrally rotatable with the support portion and being displaceably coupled to the support portion in the axial direction;
and
a dust cover covering a first end and a second end of the sliding mechanism that are opposite ends in the axial direction, the dust cover being made of an elastic body, the dust cover covering a gap between the support portion and the sliding portion.

32. The bicycle crank assembly as recited in claim 31, wherein
the crank member has an axle mounting hole having a center that is aligned with the rotational center axis, and further comprising
a crank axle coupled to the axle mounting hole to be integrally rotatable with the crank member.

33. The bicycle crank assembly as recited in claim 32, wherein
the crank axle is coupled to the axle mounting hole by press fitting.

34. The bicycle crank assembly as recited in claim 32, wherein
the crank axle is coupled to the axle mounting hole by adhesive.

35. The bicycle crank assembly as recited in claim 32, wherein
the crank axle is detachably coupled to the axle mounting hole.

36. The bicycle crank assembly as recited in claim 31, wherein
a part of the sliding mechanism is integrally installed with the crank member.

37. The bicycle crank assembly as recited in claim 31, wherein
the sliding mechanism is separately installed from the crank member.

38. The bicycle crank assembly as recited in claim 31, further comprising
a backlash removing mechanism arranged to remove backlash of the sliding mechanism in a radial direction with respect to the rotational center axis.

39. The bicycle crank assembly as recited in claim 31, wherein
the sprocket member is detachably coupled to the sliding mechanism, and further comprising
a tool-free stopper member fixing the sprocket member with respect to the sliding mechanism in the axial direction and with which the sprocket member is manually detachably coupled to the sliding mechanism.

40. A bicycle crank assembly having a rotational center axis, the bicycle crank assembly comprising:
a crank member rotatably arranged around the rotational center axis;
a sprocket member integrally and rotatably attached to the crank member;
a sliding mechanism movably coupling the sprocket member in an axial direction with respect to the crank member;
the sprocket member being is detachably coupled to the sliding mechanism and further comprising a tool-free stopper member fixing the sprocket member with respect to the sliding mechanism in the axial direction and with which the sprocket member is manually detachably coupled to the sliding mechanism, the sliding mechanism having an outer peripheral surface with a mounting groove that extends in a circumferential direction on the outer peripheral surface, the tool-free stopper member including an annular spring section that is mounted to the mounting groove and that has a smaller diameter than a mounting diameter of the mounting groove in a free state, and a pair of operating handles each extending radially outward from an end of the annular spring section for manually expanding a diameter of the annular spring section to be wider than the mounting groove; and a dust cover covering a first end and a second end of the sliding mechanism that are opposite ends in the axial direction.

41. A bicycle crank assembly having a rotational center axis, the bicycle crank assembly comprising:

a crank member having a support portion and an arm portion, the support portion extending from the arm portion in an axial direction with respect to the rotational center axis, the arm portion being integrally rotatable around the rotational center axis with the support portion;

a sprocket member having a sliding portion that extends in the axial direction, the sliding portion being integrally rotatable with the support portion, the sliding portion being displaceably coupled to the support portion in the axial direction; and a backlash removing mechanism arranged to remove backlash of the sliding mechanism in the radial direction, the backlash removing member being installed in one of the sliding portion and the support portion to contact the other of the sliding portion and the support portion.

42. The bicycle crank assembly as recited in claim 41, wherein the crank member has an axle mounting hole having a center that is aligned with the rotational center axis, and further comprising a crank axle coupled to the axle mounting hole to be integrally rotatable with the crank member.

43. The bicycle crank assembly as recited in claim 42, wherein the crank axle is coupled to the axle mounting hole by press fitting.

44. The bicycle crank assembly as recited in claim 42, wherein the crank axle is coupled to the axle mounting hole by adhesive.

45. The bicycle crank assembly as recited in claim 42, the crank axle is detachably coupled to the axle mounting hole.

46. The bicycle crank assembly as recited in claim 41, wherein a part of the sliding mechanism is integrally installed with the crank member.

47. The bicycle crank assembly as recited in claim 41, wherein the sliding mechanism is separately installed from the crank member.

48. The bicycle crank assembly as recited in claim 41, wherein the sprocket member is detachably coupled to the sliding mechanism, and further comprising a tool-free stopper member fixing the sprocket member with respect to the sliding mechanism in the axial direction and with which the sprocket member is manually detachably coupled to the sliding mechanism.

49. A bicycle crank assembly having a rotational center axis, the bicycle crank assembly comprising:

a crank member rotatably arranged around the rotational center axis;

a sprocket member integrally and rotatably attached to the crank member;

a sliding mechanism movably coupling the sprocket member in an axial direction with respect to the crank member, the sprocket member being detachably coupled to the sliding mechanism, the sliding mechanism having an outer peripheral surface with a mounting groove that extends in a circumferential direction on the outer peripheral surface, and further comprising a tool-free stopper member fixing the sprocket member with respect to the sliding mechanism in the axial direction and with which the sprocket member is manually detachably coupled to the sliding mechanism, the tool-free stopper member including an annular spring section that is mounted to the mounting groove and that has a smaller diameter than a mounting diameter of the mounting groove in a free state, and a pair of operating handles each extending radially outward from an end of the annular spring section for manually expanding a diameter of the annular spring section to be wider than the mounting groove; and a backlash removing mechanism arranged to remove backlash of the sliding mechanism in the radial direction.

50. A bicycle crank assembly comprising:

a crank member rotatably arranged around the rotational center axis, the crank member having a mounting groove that extends in a circumferential direction;

a sprocket member integrally and rotatably attached to the crank member as well as detachably attached to the crank member; and a tool-free stopper member fixing the sprocket member with respect to the crank member in an axial direction and with which the sprocket member is manually detachably coupled to the crank member, the tool-free stopper member including an annular spring section that is mounted to the mounting groove and that has a smaller diameter than a mounting diameter of the mounting groove in a free state, and a pair of operating handles each extending radially outward from an end of the annular spring section for manually expanding a diameter of the annular spring section to be wider than the mounting groove.

* * * * *